US006995820B2

(12) United States Patent
Amimori et al.

(10) Patent No.: US 6,995,820 B2
(45) Date of Patent: Feb. 7, 2006

(54) ANISOTROPIC SPECTRAL SCATTERING FILMS, POLARIZERS AND LIQUID CRYSTAL DISPLAYS

(75) Inventors: Ichiro Amimori, Minami-ashigara (JP); Isao Fujiwara, Minami-ashigara (JP)

(73) Assignee: Fuji Photo Film Co., Ltd., Minami-ashigara ( * ) Notice: Subject to any disclaimer, the term of this patent is extended or adjusted under 35 U.S.C. 154(b) by 27 days.

(21) Appl. No.: 10/845,264

(22) Filed: May 14, 2004

(65) Prior Publication Data

US 2005/0001957 A1 Jan. 6, 2005

(30) Foreign Application Priority Data

May 16, 2003 (JP) ............................ 2003-138772
May 16, 2003 (JP) ............................ 2003-138773

(51) Int. Cl.
*G02F 1/1335* (2006.01)

(52) U.S. Cl. ...................................................... 349/112

(58) Field of Classification Search ................. 349/112
See application file for complete search history.

(56) References Cited

U.S. PATENT DOCUMENTS

| | | | | |
|---|---|---|---|---|
| 6,517,914 | B1 * | 2/2003 | Hiraishi | 349/112 |
| 6,909,480 | B2 * | 6/2005 | Hiraishi et al. | 349/112 |
| 6,917,396 | B2 * | 7/2005 | Hiraishi et al. | 349/112 |
| 2002/0027626 | A1 * | 3/2002 | Hiraishi et al. | 349/112 |
| 2003/0156238 | A1 * | 8/2003 | Hiraishi et al. | 349/112 |

* cited by examiner

*Primary Examiner*—James A. Dudek
(74) *Attorney, Agent, or Firm*—Buchanan Ingersoll PC

(57) ABSTRACT

A novel anisotropic spectral scattering film is disclosed. The scattered light intensity Fx(λ, θ) at azimuthal angle θ and incident wavelength λ in an arbitrary scattering plane with respect to a surface of the film, and the scattered light intensity Fy(λ,θ) at azimuthal angle θ and incident wavelength λ in a scattering plane orthogonal to said scattering plane satisfy the following equations (1) and (2):

$$Fx(\lambda, \theta)/Fx(545, \theta) \geqq 1.2 \quad (1)$$

$$\{Fx(\lambda, \theta)/Fx(545, \theta) - Fy(\lambda, \theta)/Fy(545, \theta)\} \geqq 0.1 \quad (2)$$

provided that λ is 435 or 610 nm and θ is an arbitrary angle selected from 30–70°.

13 Claims, 8 Drawing Sheets

ANISOTROPIC SPECTRAL SCATTERING FILMS, POLARIZERS AND LIQUID CRYSTAL DISPLAYS

BACKGROUND OF THE INVENTION

1. Field of the Invention

The present invention relates to scattering films having wavelength dependency in scattered light distribution and anisotropy in scattered light distributions between the vertical and horizontal directions as well as polarizers and liquid crystal displays using said films.

2. Description of Related Art

Previously, CRTs (Cathode Ray Tubes) have been mainly used for displays in office automation equipments such as word processors, notebook computers and monitors for personal computers, mobile terminals and televisions. Recently, liquid crystal displays have widely replaced CRTs because they are thin and light and consume little power. Liquid crystal displays comprise a liquid crystal cell and a polarizer. The polarizer, which usually consists of a protecting film and a polarizing film, is obtained by dyeing a polarizing film formed of a polyvinyl alcohol film with iodine and stretching it and then laminating a protecting film onto each side of it. For example, transmissive liquid crystal displays may comprise this polarizer on each side of a liquid crystal cell, and optionally one or more optical compensation sheets. On the other hand, reflective liquid crystal displays may comprise a reflector, a liquid crystal cell, one or more optical compensation sheets and a polarizer successively. The liquid crystal cell comprises liquid crystal molecules, two substrates for enclosing them and an electrode layer for applying voltage to the liquid crystal molecules. The liquid crystal cell is switched on and off depending on the alignment of the liquid crystal molecules and can be applied to any of transmissive, reflective and half-transmissive LCDs in various operating modes such as TN (Twisted Nematic), IPS (In-Plane Switching), OCB (Optically Compensatory Bend), VA (Vertically Aligned), ECB (Electrically Controlled Birefringence) and STN (Super Twisted Nematic). However, the color and contrast that can be displayed by conventional liquid crystal displays vary with the angle at which the LCDs are viewed. Thus, viewing angle characteristics of liquid crystal displays have not surpassed those of CRTs.

STN liquid crystal displays using liquid crystal molecules having a twist angle of 180–270° could not achieve high black and white contrast because the birefringence of the liquid crystal polymers resulted in coloration such as dark blue pixels on a yellow-green background. This hue also caused a problem when images were displayed in color by such liquid crystal displays through color filters. An approach to this problem was to improve hue by optical compensation and succeeded in color compensation using a retardation film (e.g., see Nikkei Microdevice, October 1987, page 84), but the color compensation was insufficient partially because the liquid crystal layer and the retardation film have different wavelength distributions at wavelengths other than a specific wavelength to be compensated completely.

Displays in a mode using liquid crystal molecules aligned at a twist angle of 90° (TN mode) (TN-LCDs) show high display contrast with a response time of several tens of milliseconds. This is why many commercially available liquid crystal displays are TN-LCDs. It is known that the optical compensation by retardation films also helps to improve the viewing angle of the TN-LCDs. The retardation films include optical compensation sheets formed of a biaxial film; optical compensation sheets having an optically anisotropic layer containing a discotic compound on a transparent substrate; and optical compensation sheets based on a rod-like liquid crystal compound. Especially, optical compensation sheets based on a disc-shaped compound greatly improved the contrast-viewing angle characteristics of TN-LCDs so that they are widely used in commercially available TN-LCDs, but color shift with viewing angle have not been sufficiently improved.

More recently, wide viewing angle LCD modes have been proposed such as IPS mode using lateral electric field, VA mode in which liquid crystals with negative dielectric anisotropy are vertically aligned, and OCB mode in which liquid crystals are bend-aligned for switching in a birefringence mode with high-speed response. These have a very wide viewing angle and high contrast, and especially S-IPS (Super-IPS) mode further shows a very small color shift with viewing angle by optimizing the electrode shape of IPS mode to improve color shift. However, color shift with viewing angle remains still significant as compared with CRTs.

Color compensation can be certainly achieved by the above retardation films in LCDs switched by controlling polarization. However, contrast is also an important viewing angle characteristic of LCDs, and it is not easy to satisfy both color and contrast performances by using retardation films. Improvements of color in only one direction such as front can be provided by color filters instead of retardation films, but color compensation is separately required at each viewing angle in LCDs because the transmission spectrum of the liquid crystal cell varies with viewing angle.

Methods for controlling the optical path directly from the backlight rather than controlling the optical transmittance in the liquid crystal cell by a retardation film or color filter were also proposed by using a lenticular lens screen for projection liquid crystal displays or an anisotropic light scattering film (see JPA2001-159704) or a prism sheet or the like. These films can be used to distribute light in desired directions, whereby the viewing angle characteristics can be controlled independently from the light control by the liquid crystal cell. However, these films are aimed to control the path of white light but not to control spectral scattering characteristics at each viewing angle, and therefore, their color compensation effect is not complete.

As described above, color-viewing angle characteristics of LCDs could not be improved without impairing other characteristics by conventional color compensation techniques using retardation films or color filters. Even if wide viewing angle LCD modes were used, the color-viewing angle characteristics were inferior to those of CRTs.

SUMMARY OF THE INVENTION

An object of the present invention is to provide anisotropic spectral scattering films capable of independently improving color-viewing angle characteristics without impairing other characteristics such as contrast and viewing angle. Another object of the present invention is to provide polarizers having an excellent color compensation function and liquid crystal displays having improved color-viewing angle characteristics using said films.

From one aspect, the present invention provides an anisotropic spectral scattering film wherein the scattered light intensity $Fx(\lambda, \theta)$ at azimuthal angle e and incident wavelength $\lambda$ in an arbitrary scattering plane with respect to a film surface and the scattered light intensity $Fy(\lambda, \theta)$ at azimuthal angle θ and incident wavelength λ in a scattering plane orthogonal to said scattering plane satisfy the following equations (1) and (2):

$$Fx(\lambda,\theta)/Fx(545,\theta)\geqq 1.2 \quad (1)$$

$$\{Fx(\lambda,\theta)/Fx(545,\theta)-Fy(\lambda,\theta)/Fy(545,\theta)\}\geqq 0.1 \quad (2)$$

provided that λ is 435 or 610 nm and θ is an arbitrary angle selected from 30–70°.

From another aspect, the present invention provides an anisotropic spectral scattering film wherein Fx(λ, θ) and Fy(λ, θ) defined above satisfy the following equation (3):

$$\{Fx(\lambda,\theta)/Fx(545,\theta)-1\}\{Fy(\lambda,\theta)/Fy(545,\theta)-1\}<0 \quad (3)$$

provided that λ is 435 or 610 nm and θ is an arbitrary angle selected from 30–70°.

As embodiments of the present invention, the anisotropic spectral scattering film comprising a one-dimensional diffraction grating or photonic crystal structure at least partially; the anisotropic spectral scattering film comprising shape-anisotropic particles dispersed in the film; the anisotropic spectral scattering film comprising a shape-anisotropic relief on the surface; and the anisotropic spectral scattering film comprising a spectrally anisotropic scattering layer having a continuous phase consisting of a light-transmitting resin and a disperse phase having an aspect ratio of 2 to 20 wherein the refractive index difference between said continuous phase and said disperse phase is 0.03 to 0.30; are provided.

The anisotropic spectral scattering film of the present invention may further comprise a low-refractive index layer having a refractive index of 1.35 to 1.45.

From another aspect, the present invention provides a polarizer comprising at least a polarizing film and the anisotropic spectral scattering film.

The polarizer of the present invention may further comprise an optically compensation film on a different side of said polarizing film from the side having said anisotropic spectral scattering film thereon. From another aspect, the present invention provides a liquid crystal display comprising:

a backlight;

a liquid crystal cell consisting of a pair of substrates being arranged to oppose each other and having an electrode on at least one of them, and a liquid crystal layer sandwiched between said substrates; and a pair of polarizers placed outside said liquid crystal cell;

wherein the anisotropic spectral scattering film of the present invention is further included, or at least one of said pair of polarizers is the polarizer of the present invention.

As embodiments of the present invention, the liquid crystal display wherein the transmittance T(λ) of incident light at wavelength λ on said liquid crystal cell in at least one direction upward, downward, rightward or leftward at angle λ and the scattered light intensity F(λ) of forward scattered light in the same direction as that of said transmittance T(λ) of incident light at wavelength λ on said anisotropic spectral scattering film satisfy the following equation (4):

$$\{(T(\lambda)/T(545))-1\}\times\{(F(\lambda)/F(545))-1\}<0 \quad (4)$$

provided that λ is 435 or 610 nm and θ is an arbitrary angle selected from 30–70°; the liquid crystal display wherein said anisotropic spectral scattering film is disposed between said backlight and said liquid crystal layer; and the liquid crystal display wherein the display mode is TN mode or OCB mode are provided.

DESCRIPTION OF THE PREFERRED EMBODIMENTS

Figure 1:
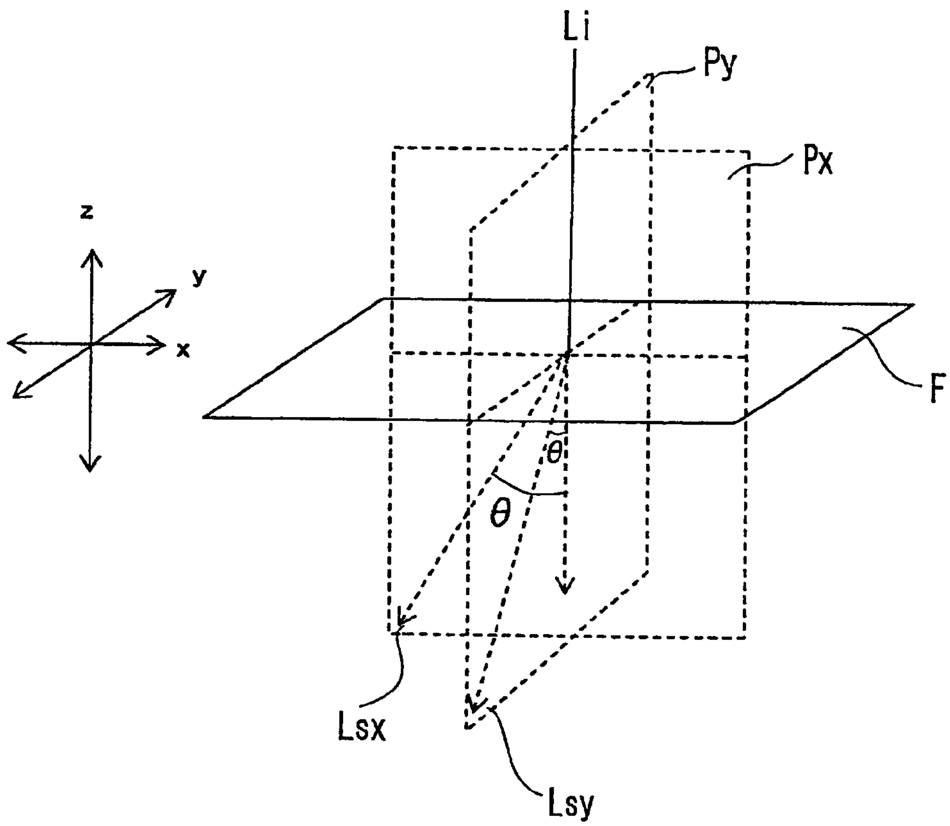
FIG. 1 is a schematic diagram used to explain scattering characteristics of anisotropic spectral scattering films of the present invention.

The present invention is explained in detail below.

As used herein, the expression "(value 1) to (value2)" means "(value 1) or more and (value 2) or less".

First, anisotropic spectral scattering films of the present invention are explained.

As used herein, the term "anisotropic spectral scattering film" means a film characterized by different scattered light distributions at two wavelengths arbitrarily selected from 435 nm (B) , 545 nm (G) and 610 nm (R) as well as different scattered light distributions between two scattering planes orthogonal to each other. A first embodiment of an anisotropic spectral scattering film of the present invention is characterized in that the scattered light intensity Fx(λ,θ) at azimuthal angle θ and incident wavelength λ in an arbitrary scattering plane with respect to the film surface and the scattered light intensity Fy(λ, θ) at azimuthal angle θ and incident wavelength λ in a scattering plane orthogonal to said scattering plane satisfy the following equations (1) and (2):

$$Fx(\lambda,\theta)/Fx(545,\theta)\geqq 1.2 \quad (1)$$

$$\{Fx(\lambda,\theta)/Fx(545,\theta)-Fy(\lambda,\theta)/Fy(545,\theta)\}\geqq 0.1 \quad (2)$$

provided that λ is 435 or 610 nm and θ is an arbitrary angle selected from 30 to 70°.

A second embodiment of an anisotropic spectral scattering film of the present invention is characterized in that said Fx(λ, θ) and Fy(λ, θ) satisfy the following equation (3):

$$\{Fx(\lambda,\theta))/Fx(545,\theta)-1\}\{Fy(\lambda,\theta)/Fy(545,\theta)-1\}<0. \quad (3)$$

The wavelengths 435 nm, 545 nm and 610 nm are typical of B, G and R, respectively. In the present invention, the wavelength λ may be within a tolerance of ±10 nm.

In equation (1) above, Fx(λ, θ)/Fx(545, θ) is preferably 1.2 to 5.0, more preferably 1.5 to 3.5. In equation (2) above, {Fx(λ, θ)/Fx(545, θ) −Fy(λ, θ)/Fy(545, θ)} is preferably 0.1 to 5.0, more preferably 0.5 to 3.0. In equation (3) above, {Fx(λ, θ)/Fx(545, θ)−1}{Fy(λ, θ)/Fy(545, θ)−1} is preferably −5.0 to −0.1, more preferably −3.0 to −0.3.

Referring to FIG. 1, a method for evaluating the wavelength dependency and anisotropy of the scattered light distribution of a film is explained.

Figure 2:
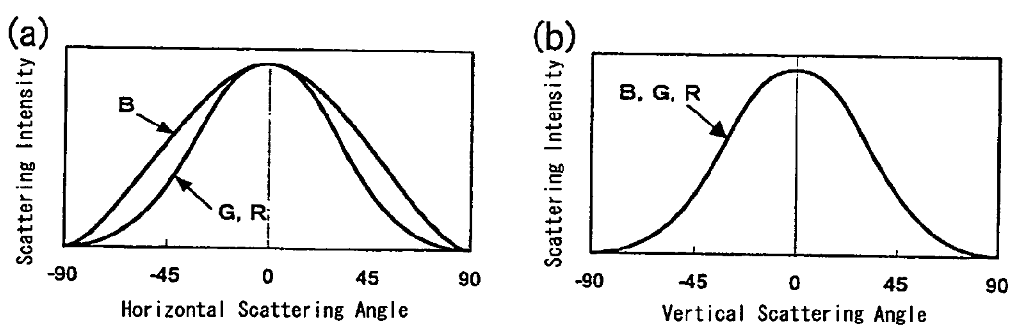
FIG. 2 shows an example of the scattered light distribution shown by an anisotropic spectral scattering film of the present invention.

Light $L_i$ at wavelength λ is incident on film F from above. The incident light $L_i$ is scattered into various directions (e.g., directions $L_{sx}$ and $L_{sy}$ shown in the figure) through the anisotropic spectral scattering film F. Suppose that the arbitrary scattering plane is a x-z plane $P_x$ (horizontal direction of the anisotropic spectral scattering film F) and the scattering plane orthogonal to it is a y-z plane $P_y$ (vertical direction of the anisotropic spectral scattering film F). An instrument for measuring the scattered light intensity (not shown) is placed below the anisotropic spectral scattering film F to measure the scattered light intensity at azimuthal angle θ in the scattering planes $P_x$ and $P_y$. Said instrument should have a displaceable detecting part so that the intensity of scattered light can be measured at various angles. A scattered light distribution curve of scattered light intensity vs. azimuthal angle θ in each plane as shown in FIG. 2(*a*) and (*b*) can be obtained by plotting the measured values of scattered light intensity vs. azimuthal angle. The anisotropy of scattered light distribution can be evaluated by comparing the scattered light distribution curves in both planes. The wavelength dependency of scattered light distribution can also be evaluated by comparing scattered light distribution curves of incident light $L_i$ at wavelengths of 545 nm and 435 nm or 610 nm obtained in the same manner in the same scattering plane.

FIG. 2(*a*) shows exemplary scattered light distribution curves in scattering plane $P_x$ and FIG. 2(*b*) shows an exemplary scattered light distribution curve in scattering plane $P_y$ orthogonal to it as measured when the film F in FIG. 1 is an anisotropic spectral scattering film according to a first embodiment of the present invention.

In the anisotropic spectral scattering film F, the scattered light intensity Fx(435 nm, θ) of incident light $L_i$ at a wavelength of 435 nm (B) at an arbitrary azimuthal angle θ(30°≦θ≦70°) is greater than the scattered light intensity Fx(545 nm, θ) of incident light $L_i$ at a wavelength of 545 nm (G) at an arbitrary azimuthal angle θ and the scattered light distribution is wavelength-dependent in scattering plane $P_x$. If Fx(435 nm, θ)/Fx(545 nm, θ) is 1.2 or more, equation (1) above is satisfied. On the other hand, the anisotropic spectral scattering film F shows an identical scattered light distribution for incident light at wavelength 545 nm (G)and wavelength 435 nm (B) in scattering plane $P_y$. Therefore, there is a difference between Fx(435 nm, θ)/Fx(545 nm, θ) and Fy(435 nm, θ)/Fy(545 nm, θ), which means anisotropy in scattered light distribution. If the difference is 0.1 or more, equation (2) above is satisfied.

Figure 3:
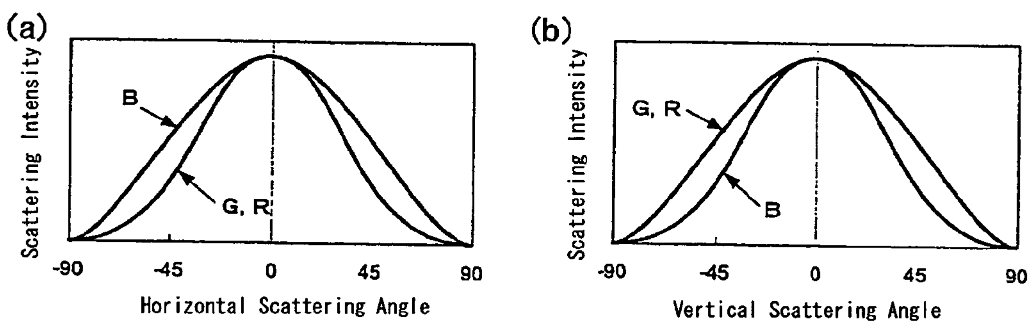
FIG. 3 shows another example of the scattered light distribution shown by an anisotropic spectral scattering film of the present invention.

FIG. 3(*a*) shows exemplary scattered light distribution curves in scattering plane $P_x$ and FIG. 3(*b*) shows exemplary scattered light distribution curves in scattering plane $P_y$ orthogonal to it as measured when the film F in FIG. 1 is an anisotropic spectral scattering film according to a second embodiment of the present invention.

In the anisotropic spectral scattering film F, the scattered light intensity Fx(435 nm, θ) of incident light $L_i$ at a wavelength of 435 nm (B) at an arbitrary azimuthal angle θ(30°≦θ≦70°) is greater than the scattered light intensity Fx(545 nm, θ) at a wavelength of 545 nm (G) in scattering plane $P_x$ and {Fx(435 nm, θ)/Fx(545 nm, θ)−1} is positive. On the other hand, the scattered light intensity Fy(435 nm, θ) at an arbitrary azimuthal angle θ(30°≦θ≦70°) is smaller than the scattered light intensity Fy(545 nm, θ) at a wavelength of 545 nm (G) in scattering plane $P_y$ and {Fy(435 nm, θ)/Fy(545 nm, θ)−1} is negative. Therefore, the product is negative and equation (3) is satisfied. The anisotropic spectral scattering film F satisfying equation (3) above has wavelength dependency and anisotropy in scattered light distribution in scattering plane $P_x$ and scattering plane $P_y$.

Although FIG. 2 and FIG. 3 show embodiments having wavelength dependency in scattered light distribution between wavelengths of 435 nm (B) and 545 nm (G) , the anisotropic spectral scattering films according to the first and second embodiments may have wavelength dependency in scattered light distribution between wavelengths of 610 nm (R) and 545 nm (G). In the anisotropic spectral scattering films according to the first and second embodiments, the scattered light distribution of the incident light at a wavelength of 545 nm (G) may not agree with the scattered light distribution of at least one of the incident light at wavelengths of 435 nm (B) and 610 nm (R), i.e. the scattered light distribution of the incident light at the other wavelength may agree with the scattered light distribution of the incident light at a wavelength of 545 nm (G) so far as they have wavelength dependency. As shown in FIG. 2 and FIG. 3, the scattered light distribution curve R of the incident light at a wavelength of 610 nm (R) in scattering plane $P_x$ may agree with the scattered light distribution curve G, for example.

Next, the principle of color compensation using spectrally anisotropic dispersion films of the present invention is explained with reference to the attached drawings.

Figure 4:
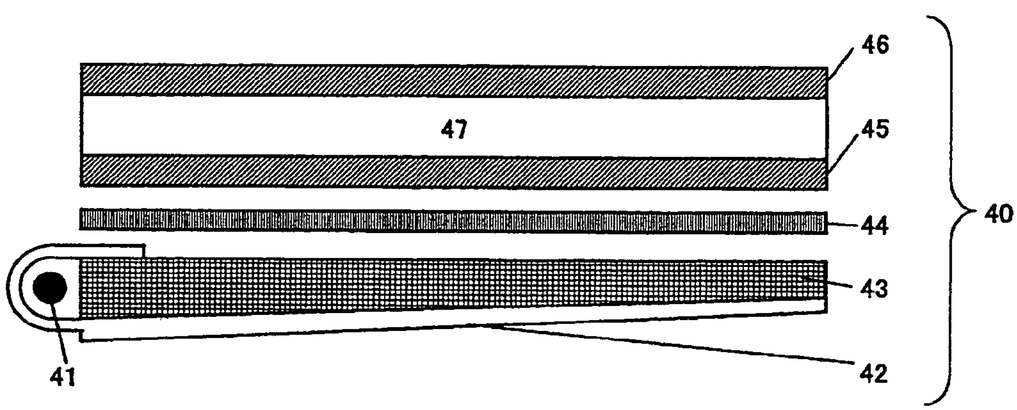
FIG. 4 is a schematic sectional diagram of an example of a liquid crystal display of the present invention.

FIG. 4 shows an example of the basic configuration of an LCD using an anisotropic spectral scattering film of the present invention. LCD 40 comprises a liquid crystal cell 47 consisting of a liquid crystal layer sandwiched between a pair of substrates (not shown) having an electrode layer on at least one of the opposed faces, a pair of light-absorbing polarizers 45, 46 between which the liquid crystal cell 47 is sandwiched, and a backlight unit consisting of a cold cathode tube 41, a planar optical waveguide 43 and a reflective sheet 42 for illuminating the liquid crystal cell 47. In addition, an anisotropic spectral scattering film 44 of the present invention is inserted between the lower light-absorbing polarizer 45 and the planar optical waveguide 43. BGR light from the backlight unit enter the liquid crystal cell 47 as scattered light having the above scattering characteristics through the anisotropic spectral scattering film 44. One example of said anisotropic spectral scattering film has different scattering distribution characteristics in the horizontal direction for B light as compared to G or R light so that B light is scattered more intensely than G or R light in the horizontal direction. It also has different scattering distribution characteristics in the vertical direction for B light as compared to G or R light so that B light is less scattered than G or R light in the vertical direction. As a result, color-viewing angle characteristics involving color shift with the viewing angle of the liquid crystal cell such as yellow coloration in the horizontal direction and blue coloration in the vertical direction are compensated for and images with reduced color shift can be displayed.

Figure 5:
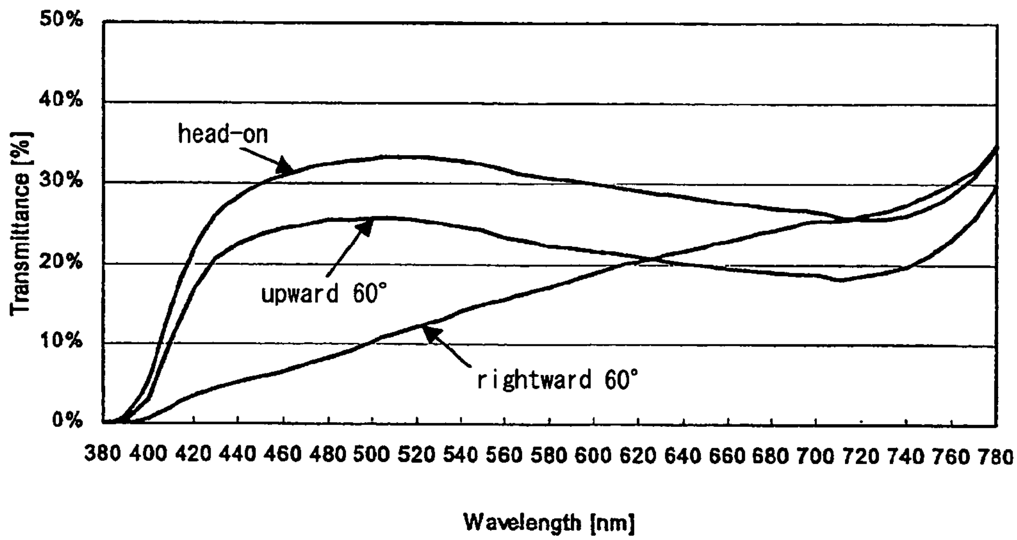
FIG. 5 shows transmission spectra of a known TN-LCD.

FIG. 5 shows transmission spectra of a TN-LCD using the optical compensation sheet described in Example 2 of JPA HEI 8-50206 in the front direction and 60° upward and rightward as exemplary transmission spectra of a liquid crystal cell. It should be noted that TN-LCDs show horizontally symmetric transmission and their transmission spectra on both directions are homologous to each other.

As shown in FIG. 5, the transmittance of the TN-LCD using an optical compensation sheet in the rightward direction is lower for the visible region on the shortwave side, i.e. blue. As a result, the TN-LCD having an optical compensation sheet shown as an example appears yellow in the rightward direction. However, any significant color shift is not found in the vertical direction from the transmission spectra of FIG. 5. To achieve color compensation in the TN-LCD having an optical compensation sheet showing the transmission spectra as shown in FIG. 5, blue light must be more intensely scattered in the horizontal direction while scattering is not wavelength-dependent in the vertical direction. To confer such transmission characteristics, a spectrally anisotropic scattering sheet showing different scattering characteristics between the vertical and horizontal directions as shown in FIG. 2, more specifically scattered light distribution characteristics including a high scattering intensity at 435 nm (B) in the horizontal direction and no wavelength dependency in scattered light distribution in the vertical direction can be used.

According to the present invention, color compensation of a liquid crystal display can be achieved using the anisotropic spectral scattering film on the condition that the color compensation factor (CCF) defined by the following equation should be negative in a target direction, such as 60° upward, downward, rightward or leftward, to be color-compensated. In the equation, T(545) is the transmittance of the liquid crystal cell and F(545) is the scattered light intensity of the anisotropic spectral scattering film at incident wavelengths of 545 nm representative of G light, and $T(\lambda)$ is the transmittance of the liquid crystal cell and $F(\lambda)$ is the scattered light intensity of the anisotropic spectral scattering film at incident wavelength of 435 nm or 610 nm representative of B and R respectively. The condition is desirably satisfied at both wavelengths of 435 nm and 610 nm, but color compensation can be achieved if the condition is satisfied even at either wavelength.

$$CCF=\{(T(\lambda)/T(545))-1\}\{(F(\lambda)/F(545))-1\}<0$$

wherein $\lambda$=435 or 610 nm.

$T(\lambda)$ can be determined by measuring the transmitted light intensity when the light source is displaced from the front position into a given direction vertically or horizontally.

Figure 6:
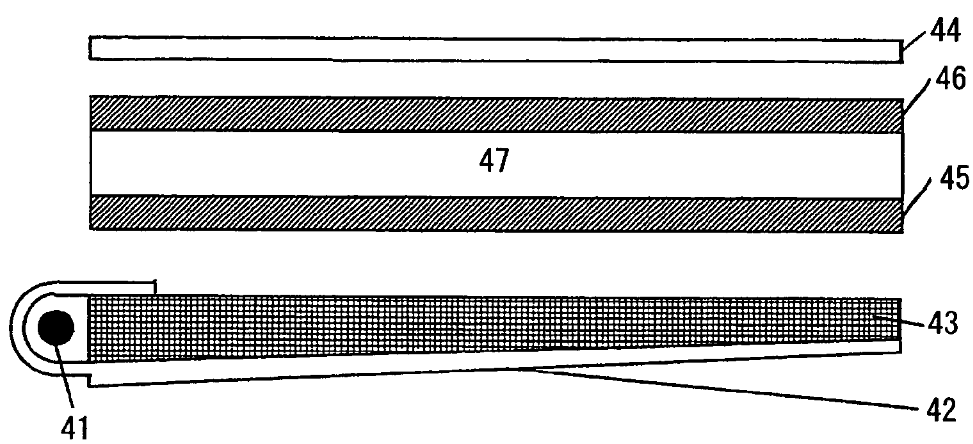
FIG. 6 is a schematic sectional diagram of an example of a liquid crystal display of the present invention.

The anisotropic spectral scattering film of the present invention can be placed at any position outside the polarizers. It can be placed between the liquid crystal cell and the backlight or outside the liquid crystal cell on the viewer's side as shown in FIG. 6. Especially in embodiments having the anisotropic spectral scattering film at the viewer's side, an anti-reflective layer is desirably disposed outside of the anisotropic spectral scattering film as described later.

The anisotropic spectral scattering film of the present invention can be combined with other members such as prism sheets or luminance-improving films described in The 17th International Display Research Conference, M98-106 (1997) or Nitto Technical Report, 2000, No. 38, page 19, or diffusing films described in '94 Markets of Peripheral Materials/Chemicals of Liquid Crystal Displays (published by CMC Publishing Co., Ltd.) page 258 and others.

Figure 7:
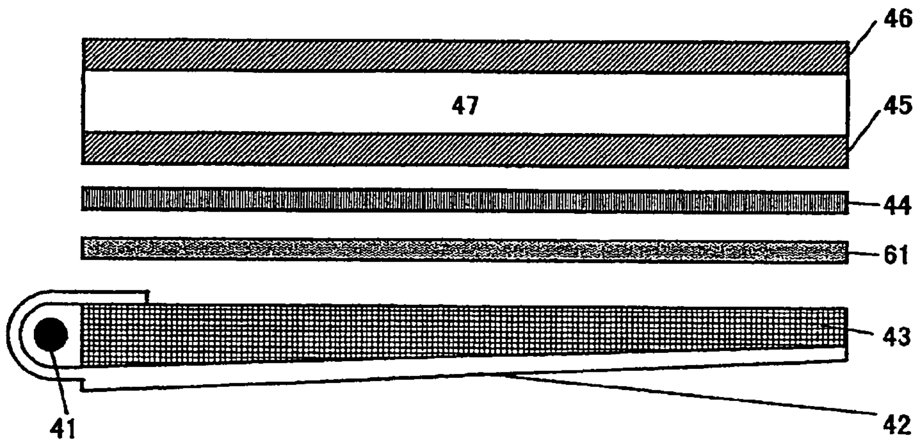
FIG. 7 is a schematic sectional diagram of an example of a liquid crystal display of the present invention.
Figure 8:
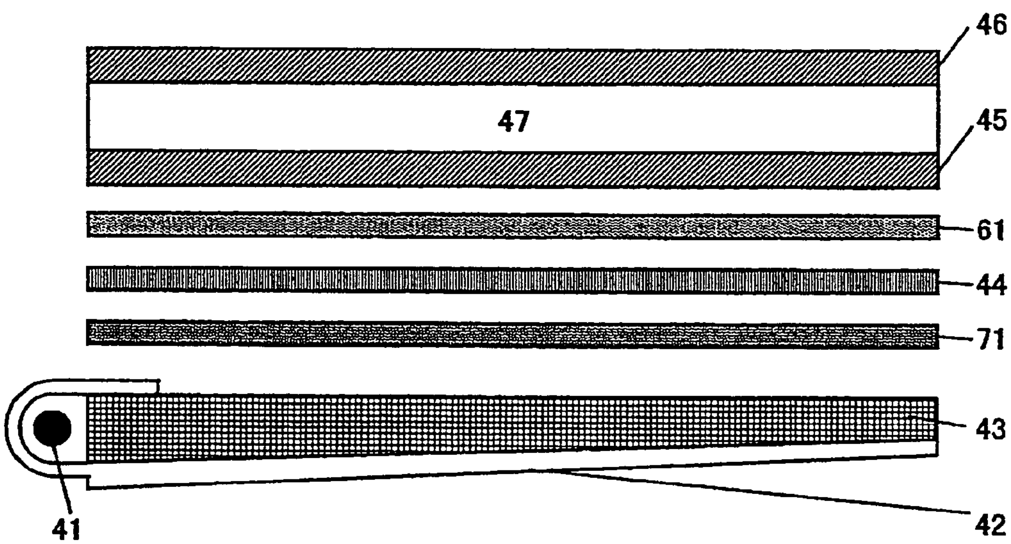
FIG. 8 is a schematic sectional diagram of an example of a liquid crystal display of the present invention.
Figure 9:
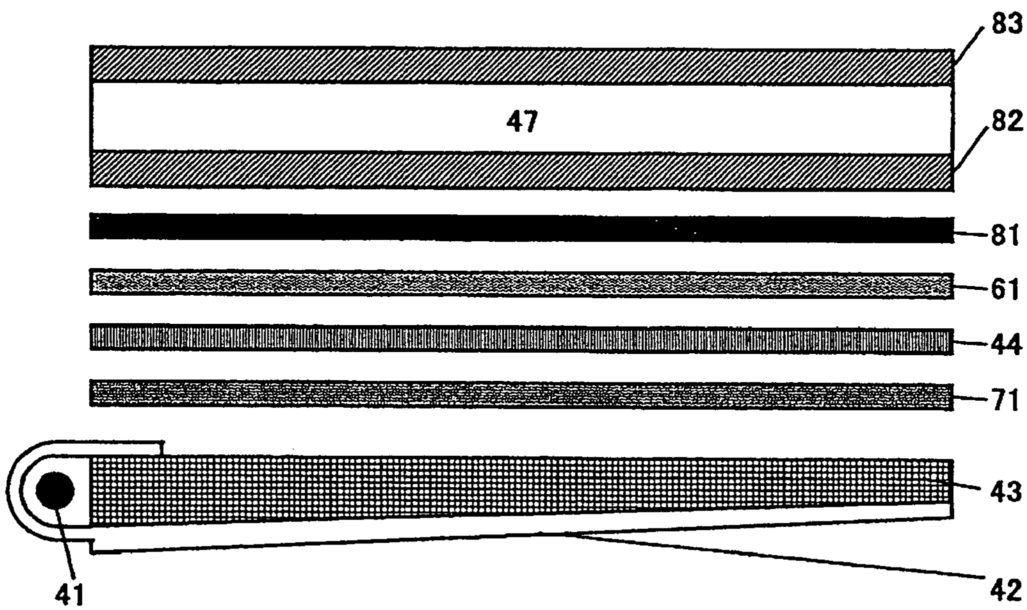
FIG. 9 is a schematic sectional diagram of an example of a liquid crystal display of the present invention.
Figure 10:
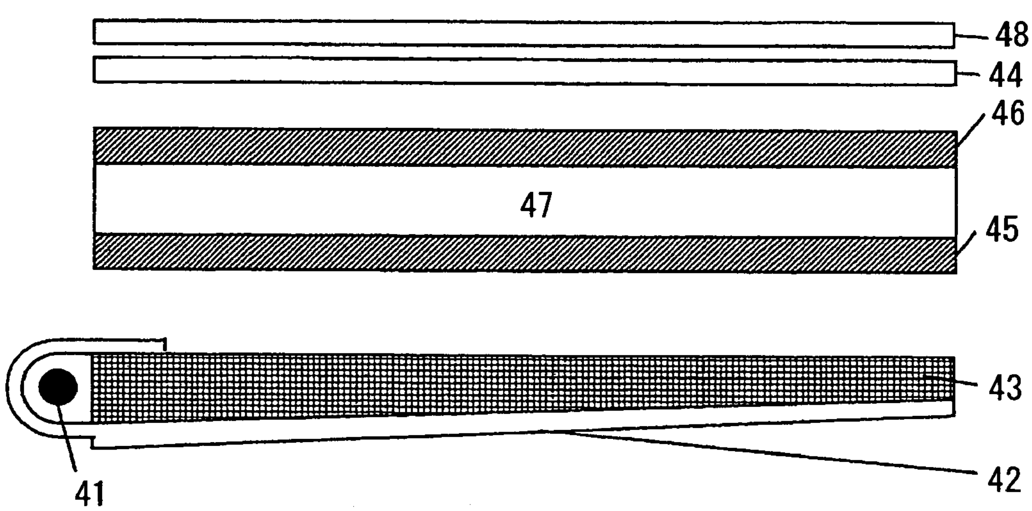
FIG. 10 is a schematic sectional diagram of an example of a liquid crystal display of the present invention.

FIG. 7 shows an example of the configuration of an LCD in which an anisotropic spectral scattering film 44 of the present invention is combined with a prism sheet 61, FIG. 8 shows an example of the configuration in which a diffusing film 71 is further combined, and FIG. 9 shows an example of the configuration in which a luminance-improving film 81 is further combined. FIG. 9 is also an example in which polarizers 82, 83 having an optical compensation sheet are used. Polarizers having an optical compensation sheet will be described later. FIG. 10 shows an LCD having a configuration in which an anti-reflective film 48 as described in JPA 2001-264508 is placed further above the anisotropic spectral scattering film 44 of the liquid crystal display shown in FIG. 6 (on the viewer's side). In the LCD shown in FIG. 10, the color-viewing angle characteristics have been improved by the anisotropic spectral scattering film 44 similarly to the LCD 10 shown in FIG. 6 and the loss of viewability due to reflection has been reduced by the anti-reflective film 48.

The structure of the anisotropic spectral scattering film of the present invention is not specifically limited so far as it shows the scattering characteristics described above. Specific embodiments include those comprising a one-dimensional diffraction grating or photonic crystal structure at least partially; those comprising shape-anisotropic particles dispersed in the film; and those comprising a shape-anisotropic relief on the surface.

The one-dimensional diffraction grating that can be used in the present invention may be a transmissive diffraction grating using a one-dimensional grid as described e.g., at page 58 of P. Yeh, "Photorefractive Nonlinear Optics (translated in Japanese by Tomita Yasuo and Kitayama Kenichi, published by MARUZEN & WILEY, March 1995). The transmissive diffraction grating using a one-dimensional grid can be prepared by e.g., two-beam interference exposure; exposure of a resist or photopolymer to UV or visible light through a grid mask prepared by electron beam lithography; applying a UV-curable resin or thermosetting resin on the relief on a grid preliminarily prepared by a similar method and curing and then separating it; or mechanically transferring the relief by embossing or the like.

The photonic crystals that can be used in the present invention can be those described in Kawakami, "Techniques and Applications of Photonic Crystals (published by CMC Publishing Co., Ltd., March 2002), whereby diffraction can be controlled at a plurality of different wavelengths and in a plurality of different directions. The photonic crystal can be prepared by multiple-beam interference exposure using three or more beams or closely arranging monodisperse microparticles on a substrate.

Figure 11:
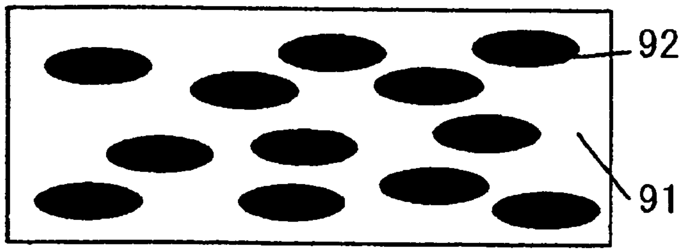
FIG. 11 is a top view schematically showing an example of an anisotropic spectral scattering film of the present invention.

One example of an anisotropic spectral scattering film of the present invention can also be a film having a continuous phase (e.g., polymer phase) 91 in which shape-anisotropic particles 92 having a different refractive index from that of the continuous phase are dispersed as shown in FIG. 11. The shape-anisotropic particles 92 are preferably dispersed in a predetermined alignment so that the film can show the dispersion characteristics described above. The shape-anisotropic particles can be dispersed in a predetermined alignment in the film by e.g., dispersing the shape-anisotropic particles in the film and then stretching the film to align the particles as described in JPA HEI 9-297204; dispersing spherical particles or a liquid or monomer or bubbles having a different refractive index from that of the binder of the film and capable of being deformed by an external force in the film and then stretching the film to align/deform the particles; or other methods. The film may be heated or humidified before or during stretching to promote alignment or deformation.

The anisotropic spectral scattering film of the present invention can also be a film having a shape-anisotropic surface relief, which can be prepared by applying a polymer solution containing particles dispersed therein on a substrate to confer a relief layer and then stretching the substrate to form an anisotropic relief; directly conferring an isotropic relief on the film by embossing, sandblasting or the like and then stretching the film to form an anisotropic relief; applying a UV-curable resin or thermosetting resin on the relief surface of a master preliminary having a surface relief formed by electron-beam lithography or laser irradiation or the like, and curing then separating it; and mechanically transferring the relief by embossing or the like. When anisotropy is developed by stretching, the film may be heated or humidified before or during stretching to promote alignment or deformation.

When the anisotropic spectral scattering film of the present invention is used in OCB-mode liquid crystal displays, horizontally asymmetric color compensation may be needed because of the horizontally asymmetric transmission spectrum. Vertical color compensation may also be sometimes needed. One-dimensional diffraction gratings and anisotropic scattering films as described above are unsuitable for such cases, but the film must be designed to freely control the path of scattered light at each wavelength.

A technique for splitting a white light to a desired position is beam-splitting and diffracted by a hologram as described in e.g., JPA HEI 6-308332, and holograms can be used for the preparation of anisotropic spectral scattering films of the present invention. By using holograms, only a desired wavelength can be diffracted from a white light beam (Lipman hologram, etc.) or a plurality of wavelengths can be freely diffracted using one diffraction grating. If a hologram is used to prepare an anisotropic spectral scattering film of the present invention, it also serves as a Fresnel zone plate so that the emission angle can be decreased to focus beams from the backlight to the front.

Holograms include amplitude holograms using transmittance variation and phase holograms using refractive index variation or surface relief, and amplitude holograms normally have a low transmittance because light from the backlight is absorbed when it passes through the holograms. Therefore, the hologram used in the present invention is preferably a phase hologram. Phase holograms include the refractive index variation type obtained by bleaching an amplitude hologram prepared with a silver halide emulsion or using dichromate gelatin or a photopolymer, or those having a surface relief formed with a photoresist or thermoplastic.

A method for designing such a hologram comprises e.g., determining the amplitude and phase on the hologram plane showing desired scattering and diffraction performance by the Computer Generated Hologram (CGH) technique and drawing the computation results on an electron beam resist by electron beams and developing them. The computer generated hologram technique is described in e.g. Sing H. Lee: Selected Papers on Computer-Generated Hologram and Diffractive Optics (Spie Milestone Series, Vol MS33).

The computer generated hologram prepared as above can be optically reproduced by using it as a master plate to holographically expose it to a holographic sensitive material. Alternatively, it can also be reproduced by applying a UV-curable resin or thermosetting resin on the relief on a computer-generated hologram and curing and then separating it; or mechanically transferring the relief by embossing or the like. The master plate has preferably a large area from the viewpoint of productivity, and large-area master plates can be prepared by tiling original plates without clearance during the reproduction of a manufacturing plate by electroforming or embossing or the like from a master plate prepared with an electron beam resist or the like. The clearance is preferably 50 microns or less, more preferably 20 microns or less.

The base material for the anisotropic spectral scattering film of the present invention is not specifically limited, but various materials can be used so far as they are suitable for conferring the structure above and should not impair the transparency in the film. The film used in LCDs should preferably be flexible, and preferably selected from plastic films. Examples of materials for the film of the present invention include cellulose esters (e.g., cellulose acetates (triacetyl cellulose, diacetyl cellulose) , propionyl cellulose, butyryl cellulose, acetyl propionyl cellulose, nitrocellulose), polyamides, polycarbonates, polyesters (e.g., polyethylene terephthalate, polyethylene naphthalate, poly-1,4-cyclohexane dimethylene terephthalate, polyethylene-1,2-diphenoxyethane-4,4'-dicarboxylate, polybutylene terephthalate), polystyrenes (e.g., syndiotactic polystyrenes), polyolefins (e.g., polypropylene, polyethylene, polymethylpentene), polysulfones, polyether sulfones, polyarylates, polyetherimides, polymethyl methacrylates, polyetherketones, norbornenes (from Nippon Zeon Co., Ltd.), Zeonors(from Nippon Zeon Co., Ltd.) and Artons (from JSR Corporation). Cellulose esters, norbornenes, Zeonors, Artons, polycarbonates and polyethylene terephthalates are preferred. The film preferably has an optical transmittance of 80% or more, more preferably 86% or more.

When the film is stretched after dispersion of particles or a liquid or the like in it, a polymer solution containing the particles or liquid or the like dispersed therein is preferably applied on another substrate and dried and then the resulting film is peeled off and stretched, and for this purpose, polymers readily soluble in water or organic solvents are preferred in addition to the materials listed above. Examples of such polymers include water-soluble polymer compounds such as gelatin, agarose, cellulose, polyvinyl alcohol and their derivatives or polyacrylic acids, polygalacturonic acids, polyalginic acids and salts thereof. Examples of organic solvent-soluble polymer compounds include poly(meth)acrylates and ethylene vinyl alcohol copolymers in addition to the plastic film materials mentioned above.

A film having a spectrally anisotropic scattering layer comprising a continuous phase formed of a light-transmitting resin and a flat disperse phase having a different refractive index from that of the continuous phase according to an embodiment of an anisotropic spectral scattering film of the present invention is explained more in detail.

The spectrally anisotropic scattering layer may contain other components, e.g., matte particles for controlling the surface relief may be dispersed therein. In addition, the spectrally anisotropic scattering layer may have a multilayered structure.

In preferred embodiments of the spectrally anisotropic scattering layer, the optimal aspect ratio of the disperse phase varies with the refractive index difference between the continuous phase and the disperse phase. In preferred embodiments, the aspect ratio is 2 to 20 if the refractive index difference between the continuous phase and the disperse phase is 0.03 to 0.30, or the aspect ratio is 8 to 20 if the refractive index difference is 0.03 to 0.15, or the aspect ratio is 2 to 10 if the refractive index difference is 0.15 to 0.30. The minor axis of the disperse phase preferably has a length of 0.75 μm or less, more preferably 0.5 μm or less. The length of the disperse phase in the direction of the thickness of the layer is typically equal to the length of the minor axis, preferably 0.75 μm or less, more preferably 0.5 μm or less. However, the invention is not limited to these values. The lengths of the minor and major axes and the aspect ratio of the disperse phase can be determined by observing the surface of the spectrally anisotropic scattering layer under an electron microscope.

The disperse phase preferably has a cylindrical or rod-like or elliptic shape because the film of the present invention preferably has a scattering intensity continuously varying with the inclination of the viewing angle from the normal direction of the film.

FIG. 11 is a top view schematically showing an example of an anisotropic spectral scattering film according to the above embodiment. The anisotropic spectral scattering film shown in FIG. 11 comprises a continuous phase 91 and a flat disperse phase 92. The anisotropic spectral scattering film shown in FIG. 11 has different scattered light distributions between the horizontal and vertical directions or anisotropy in scattered light distribution because the disperse phase having a different refractive index from that of the continuous phase has a flat shape. For example, the film containing spherical particles dispersed therein as described in JPA HEI 11-95012 (or JPA 2002-328228) does not show the spectrally anisotropic scattering characteristics described above because of no difference in scattered light distribution between the vertical and horizontal directions.

The film comprising a continuous phase formed of a resin and a flat disperse phase can be prepared by e.g. dispersing flat particles in the film and then stretching the film as described in JPA HEI 9-297204; or dispersing spherical particles or a liquid or monomer or bubbles capable of being deformed by an external force in the film and then stretching the film to align/deform the particles. The film may be heated or humidified before or during stretching to promote alignment or deformation. The preferred range of the mixing ratio of the materials forming the continuous and disperse phases during the preparation depends on the materials, but typically the ratio of the material of the disperse phase to the material of the continuous phase is preferably 20 to 95% by mass, more preferably 40 to 90% by mass.

In the case of OCB-mode liquid crystal displays, horizontally asymmetric color compensation may be needed because of the horizontally asymmetric transmission spectrum. Vertical color compensation may also be sometimes needed. Films comprising a disperse phase having a single rotation axis are unsuitable for such cases, but the film must be designed to freely control the path of scattered light at each wavelength. An example is a disperse phase having three axes defined as $a>b>c$ in which particles having a shape satisfying $a/b$ of 2 to 20 and $(a-c)/(a-b)$ of 1.05 to 3.0 are aligned in such a manner that the plane containing a and b may be perpendicular to the plane of incidence.

The refractive index of the continuous phase, i.e. the refractive index of the light transmitting resin is preferably 1.45 to 2.00. The light transmitting resin used for the continuous phase is not specifically limited, but can be selected from light transmitting resins preferably having a refractive index in the range described above.

When the film is stretched after dispersion of particles or a liquid or the like in it, a polymer solution containing the particles or liquid or the like dispersed therein is preferably applied on another substrate and dried and then the resulting film is peeled off and stretched, and the resin forming the continuous phase is preferably a polymer readily soluble in water or organic solvents. Examples of such polymers include water-soluble polymer compounds such as gelatin, agarose, cellulose, polyvinyl alcohol and their derivatives or polyacrylic acids, polygalacturonic acids, polyalginic acids and salts thereof. Examples of organic solvent-soluble polymer compounds include cellulose esters (e.g., cellulose acetates (triacetyl cellulose, diacetyl cellulose), propionyl cellulose, butyryl cellulose, acetyl propionyl cellulose, nitrocellulose), polyamides, polycarbonates, polyesters (e.g., polyethylene terephthalate, polyethylene naphthalate, poly-1,4-cyclohexane dimethylene terephthalate, polyethylene-1,2-diphenoxyethane-4,4'-dicarboxylate, polybutylene terephthalate), polystyrenes (e.g., syndiotactic polystyrenes), polyolefins (e.g., polypropylene, polyethylene, polymethylpentene), polysulfones, polyether sulfones, polyarylates, polyetherimides, polymethyl methacrylates, polyetherketones, norbornenes (from Nippon Zeon Co., Ltd.), Zeonors (from Nippon Zeon Co., Ltd.) and Artons (from JSR Corporation). Cellulose esters, norbornenes, Zeonors, Artons, polycarbonates and polyethylene terephthalates are preferred as well as poly(meth)acrylates and ethylene vinyl alcohol copolymers.

The material for the disperse phase is not specifically limited so far as it ensures a difference in refractive index from the continuous phase and a flat shape. In view of the manufacturability, the disperse phase is preferably formed from a resin. The material used for the disperse phase is not specifically limited so far as it provides a refractive index difference of 0.03 to 0.30 from that of the continuous phase and an aspect ratio of 2 to 20, but preferably selected from organic polymers or organic low molecules, especially monomers polymerizable by heat or ionizing radiation to freely control shape-anisotropy by stretching or the like. Needle-like, lamellar, chain-like (a series of spherical particles) or other shape-anisotropic inorganic microparticles are preferred when a refractive index difference of 0.2 or more is required.

Especially preferred monomers for attaining a sufficient refractive index difference are low-refractive index monomers having a refractive index of 1.5 or less or high-refractive index monomers having a refractive index of 1.6 or more because the material typically used for the continuous phase has a refractive index of 1.5 to 1.6.

Examples of low-refractive index monomers include fluoro-olefins (e.g., fluoroethylene, vinylidene fluoride, tetrafluoroethylene, hexafluoropropylene, perfluoro-2,2-dimethyl-1,3-dioxol), partially or totally fluorinated alkyl ester derivatives of (meth)acrylic acids (e.g., BISCOAT 6FM (from Osaka Organic Chemical Industry, Ltd.) and M-2020 (from Daikin Industries, Ltd.)), partially or totally fluorinated vinyl ethers.

Examples of high-refractive index monomers include bis(4-methacryloyl thiophenyl)sulfide, vinyl naphthalene, vinyl phenyl sulfide, 4-methacryloxyphenyl-4'-methoxyphenyl thioether.

Examples of shape-anisotropic inorganic microparticles include mica particles (from CO-OP Chemical Co., Ltd.), needle-like titanium oxide particles (from Ishihara Sangyo Kaisha, Ltd.), plate-like alumina (from YKK Corporation), etc.

The anisotropic spectral scattering film according to the present embodiment may have other layers than the spectrally anisotropic scattering layer. Not only the anisotropic spectral scattering film according to the present embodiment but also anisotropic spectral scattering films of any embodiment of the present invention may have various other layers including the low-refractive index layer described below.

The low-refractive index layer is preferably provided as the outermost layer on the side having the spectrally anisotropic scattering layer for the purpose of conferring an anti-reflective function. The low-refractive index layer preferably has a refractive index of 1.35 to 1.45. The anisotropic light scattering layer and the low-refractive index layer may not be adjacent to each other.

The refractive index of the low-refractive index layer preferably satisfies equation (I) below:

$$(m\lambda/4)\times 0.7 < n_1 d_1 < (m\lambda/4)\times 1.3 \qquad \text{Equation (I)}$$

wherein m is a positive odd number (typically 1) $n_1$ is the refractive index of the low-refractive index layer, and $d_1$ is the thickness (nm) of the low-refractive index layer. $\lambda$ is the wavelength of visible light in the range of 450 to 650 (nm).

The expression "satisfy equation (I)" above means the presence of m (a positive odd number, typically 1) satisfying equation (I) in the wavelength range above.

For preparations of a low-refractive index layer, fluoro-resin obtained by curing a thermosetting or ionizing radiation-curable polymerizable fluoro-compound may be used. The layer consisting of such fluoro-resin has a higher scratch resistance as compared to low-refractive index layers comprising magnesium fluoride or calcium fluoride, and thus it can be disposed as an outermost layer. The refractive index of the thermosetting or ionizing radiation-curable polymerizable fluoro-compound is preferably 1.35 to 1.45. The cured fluoro-resin preferably has a kinetic friction coefficient of 0.03 to 0.15 and a contact angle for water of 90 to 120 degrees.

Such polymerizable fluoro-compounds include perfluoroalkyl-containing silane compounds (e.g. (heptadecafluoro-1,1,2,2-tetradecyl)triethoxysilane) as well as fluoro-copolymers comprising units derived from a fluoro-monomer and derived from a monomer for conferring a crosslinkable group.

Specific examples of fluoro-monomer units include e.g. fluoro-olefins (e.g. fluoroethylene, vinylidene fluoride, tetrafluoroethylene, hexafluoropropylene, perfluoro-2,2-dimethyl-1,3-dioxol, etc.), partially or totally fluorinated alkyl ester derivatives of (meth)acrylic acids (e.g., BISCOAT 6FM (from Osaka Organic Chemical Industry, Ltd.) and M-2020 (from Daikin Industries, Ltd.)), partially or totally fluorinated vinyl ethers.

Monomers for conferring a crosslinkable group include (meth)acrylate monomers initially having a crosslinkable functional group in the molecule such as glycidyl methacrylate as well as (meth) acrylate monomers having a carboxyl, hydroxyl, amino, sulfonate or the like group (e.g. (meth) acrylic acid, methylol(meth)acrylate, hydroxyalkyl(meth) acrylate, allyl acrylate, etc.). JPA HEI 10-25388 and JPA HEI 10-147739 disclose that a crosslinked structure can be introduced into the latter monomers after copolymerization.

Not only the copolymers of a fluoro-monomer and a monomer for conferring a crosslinkable group described above but also polymers obtained by further copolymerizing another monomer with those copolymers can also be used for the low-refractive index layer.

The another monomer that can be copolymerized is not specifically limited but can be selected from e.g. olefins (ethylene, propylene, isoprene, vinyl chloride, vinylidene chloride, etc.), acrylates (methyl acrylate, ethyl acrylate, 2-ethylhexyl acrylate), methacrylates (methyl methacrylate, ethyl methacrylate, butyl methacrylate, ethylene glycol dimethacrylate, etc.), styrene derivatives (styrene, divinyl benzene, vinyl toluene, a-methyl styrene, etc.), vinyl ethers (methyl vinyl ether, etc.), vinyl esters (vinyl acetate, vinyl propionate, vinyl cinnamate, etc.), acrylamides (N-tert-butyl acrylamide, N-cyclohexyl acrylamide, etc.) , methacrylamides, acrylonitrile derivatives, etc.

The fluoro-resin used for the low-refractive index layer is preferably used with Si oxide ultrafine particles preferably having an average particle diameter of 0.1 $\mu$m or less, more preferably 0.001 to 0.05 $\mu$m to confer scratch resistance. The refractive index is preferably lower for the purpose of anti-reflection, but the resistance to scratch is lowered when the refractive index of the fluoro-resin is decreased. Thus, the best balance between scratch resistance and low refractive index can be found by optimizing the refractive index of the fluoro-resin and the amount of Si oxide ultrafine particles to be added.

As Si oxide ultrafine particles, colloidal silica dispersed in a commercially available organic solvent may be directly added to the coating solution or various commercially available silica powders may be dispersed in an organic solvent.

Figure 12:
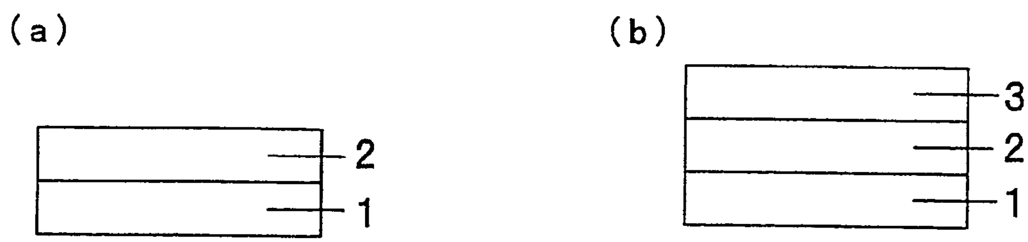
FIG. 12 is a schematic sectional diagram of an example of an anisotropic spectral scattering film of the present invention.

An example of an anisotropic spectral scattering film according to the present embodiment comprises a transparent substrate film 1 and a spectrally anisotropic scattering layer 2 as shown in FIG. 12(*a*) . Another example of an anisotropic spectral scattering film according to the present embodiment further comprises a low-refractive index layer 3.

The anisotropic spectral scattering film according to the present embodiment may have a substrate supporting the spectrally anisotropic scattering layer. The transparent substrate may be formed of a material selected from cellulose esters (e.g., cellulose acetates (triacetyl cellulose, diacetyl cellulose), propionyl cellulose, butyryl cellulose, acetyl propionyl cellulose, nitrocellulose) , polyamides, polycarbonates, polyesters (e.g., polyethylene terephthalate, polyethylene naphthalate, poly-1,4-cyclohexane dimethylene terephthalate, polyethylene-1,2-diphenoxyethane-4,4'-dicarboxylate, polybutylene terephthalate), polystyrenes (e.g., syndiotactic polystyrenes), polyolefins (e.g., polypropylene, polyethylene, polymethylpentene), polysulfones, polyether sulfones, polyarylates, polyetherimides, polymethyl methacrylates, polyetherketones, norbornenes (from Nippon Zeon Co., Ltd.) , Zeonors (from Nippon Zeon Co., Ltd.) , Artons (from JSR Corporation). Cellulose esters, norbornenes, Zeonors, Artons, polycarbonates and polyethylene terephthalates are preferred. Especially when the anisotropic spectral scattering film according to the present embodiment is used as a protecting film for polarizers, the transparent substrate is preferably a triacetyl cellulose film. The triacetyl cellulose film can be prepared by solvent casting using a solution containing a cellulose ester and other components as a dope. The dope is cast onto a drum or belt and the solvent is evaporated to form a film. The dope before casting is preferably adjusted to a solids content of 10 to 40% by mass. The solids content is more preferably 18 to 35% by mass. The dope may be cast to form two or more layers. The drum or belt preferably has a mirror-finished surface. Casting and drying techniques in solvent casting are described in U.S. Pat. Nos. 2,336,310, 2,367,603, 2,492,078, 2,492,977, 2,492,978, 2,607,704, 2,739,069 and 2,739,070; UK Patents Nos. 640731 and 736892; JPB SHO 45-4554, JPB SHO 49-5614, JPA SHO 60-176834, JPA SHO 60-203430 and JPA SHO 62-115035.

The dope is preferably cast onto a drum or belt having a surface temperature of 10° C. or less. The dope is preferably air-dried for 2 seconds or more after casting. The resulting film can be stripped off the drum or belt and dried with hot air at temperatures varying stepwise from 100 to 160° C. to evaporate the residual solvent (see JPB HEI 5-17844). This method can shorten the time from casting to stripping. To carry out this method, the dope must be gelled at the surface temperature of the drum or belt during casting.

When a plurality of cellulose ester solutions are to be cast, a film can be prepared by stacking layers of the cellulose ester-containing solutions cast from a plurality of nozzles provided at intervals in the traveling direction of the substrate (see JPA SHO 61-158414, JPA HEI 1-122419 and JPA HEI 11-198285). A film can also be prepared by casting cellulose ester solutions from two nozzles (see JPB SHO 60-27562, JPA SHO 61-94724, JPA SHO 61-947245, JPA SHO 61-104813, JPA SHO 61-158413 and JPA HEI 6-134933). Another suitable method for casting cellulose ester films comprises enveloping a flow of a high-viscosity cellulose ester solution in a low-viscosity cellulose ester solution and extruding the high-viscosity and low-viscosity cellulose ester solution at the same time (see JPA SHO 56-162617).

The triacetyl cellulose film is preferably surface-treated. Examples of the surface treatment include corona discharge treatment, glow discharge treatment, flame treatment, acid treatment, alkaline treatment and UV treatment. To maintain the planarity of the film, the temperature of the triacetyl cellulose film during the surface treatment is preferably Tg (grass transition temperature) or less, specifically 150° C. or less.

An especially preferred surface treatment of the triacetyl cellulose film is an acid or alkaline treatment, i.e. a saponification treatment of the cellulose ester, most preferably an alkaline treatment. The surface treatment is specifically explained below taking an alkaline saponification treatment as an example. The alkaline treatment is preferably performed through a cycle of immersing the film surface in an alkaline solution, then neutralizing it with an acid solution, and washing it with water and drying it.

The alkaline solution is preferably a potassium hydroxide solution and sodium hydroxide solution. The normal concentration of hydroxide ions is preferably in the range of 0.1 to 3.0 N, more preferably 0.5 to 2.0 N. The temperature of the alkali solution is preferably in the range of room temperature to 90° C., more preferably 40 to 70° C.

The surface energy of the film after the surface treatment is preferably 55 mN/m or more, more preferably in the range of 60 to 75 mN/m. The surface energy of solids can be determined by the methods based on contact angle, heat of wetting and adsorption as described in "Foundations and Applications of Wetting" published by Realize-sha (currently known as SIPEC Corporation), Dec. 10, 1989. In the case of the triacetyl cellulose film according to the present embodiment, the contact angle analysis is preferably used. Specifically, two solutions having a known surface energy are dropped onto the triacetyl cellulose film and the surface energy of the film can be calculated from the contact angle defined as the angle between the tangent line to a droplet and the film surface at the intersection of the surface of the droplet with the film surface on the side containing the droplet. The triacetyl cellulose film can be provided with an overcoat layer (see JPA HEI 7-333433).

The preferred range of the thickness of the anisotropic spectral scattering film according to the present embodiment depends on the layer configuration, but typically the spectrally anisotropic scattering layer, low-refractive index layer and transparent substrate preferably have thicknesses of 1.0 to 20.0 μm, 0.05 to 0.15 μm and 20 to 150 μm, respectively, more preferably 3.0 to 10.0 μm, 0.08 to 0.12 μm and 30 to 120 μm, respectively.

Anisotropic spectral scattering films of the present invention can be incorporated into a liquid crystal display as a member integrated with a polarizer. Typically, the polarizer consists of a polarizing film and a pair of protecting films between which the polarizing film is sandwiched. For example, an anisotropic spectral scattering film of the present invention can be laminated to a polarizer having the above configuration (i.e., the anisotropic spectral scattering film can be further laminated onto the surface of one protecting film), or one protecting film can be replaced by an anisotropic spectral scattering film of the present invention. Moreover, the polarizer can be laminated to an optical compensation sheet as described in e.g. JPA HEI 6-75116, EP0576304A1, JPA HEI 6-214116, U.S. Pat. No. 5,583,679, U.S. Pat. No. 5,646,703 and JPA HEI 10-186356 and the like.

Figure 13:
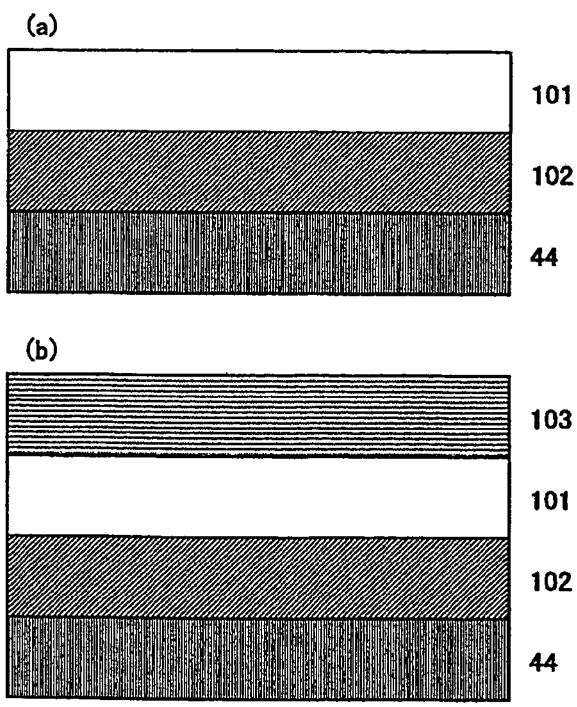
FIG. 13 is a schematic sectional diagram of an example of a polarizer of the present invention.

FIG. 13(*a*) shows an example of the configuration of a polarizer comprising an anisotropic spectral scattering film 44 of the present invention, a polarizing film 102 and a protecting film 101 layered in this order, and FIG. 13(*b*) shows an example of the configuration of a polarizer further comprising an optical compensation film 103 on the protecting film 101. In the polarizers having these configurations, the anisotropic spectral scattering film 44 also serves as one of protecting films for the polarizing film 102. The polarizer having the configuration shown in (a) has not only a polarizing function but also the function of compensating for the viewing angle-dependent color shift by the presence of the anisotropic spectral scattering film 44, and the polarizer having the configuration shown in (b) further has an optical compensation function by the presence of the optical compensation film 103. Thus, the incorporation of polarizers having these configurations can contribute to the slimming down of liquid crystal displays.

Figure 14:
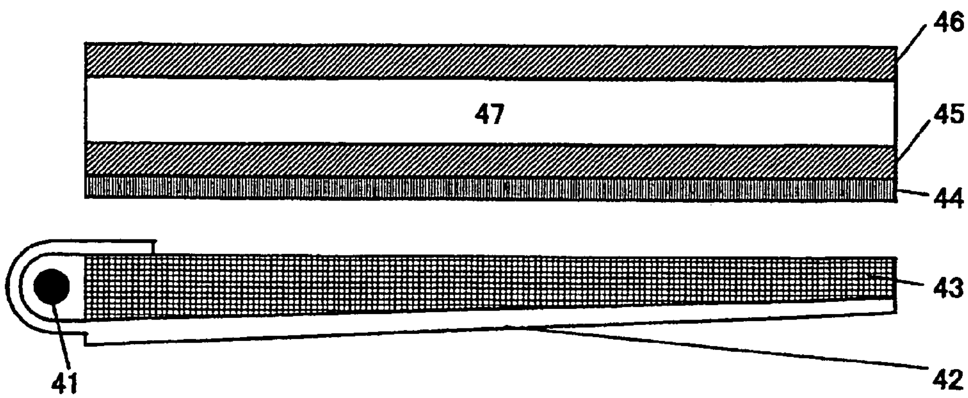
FIG. 14 is a schematic sectional diagram of an example of a liquid crystal display of the present invention.

Polarizers having these configurations are preferably used as lower light-absorbing polarizers as shown in FIG. 14, and the anisotropic spectral scattering film 44 is preferably incorporated into the backlight side.

Figure 15:
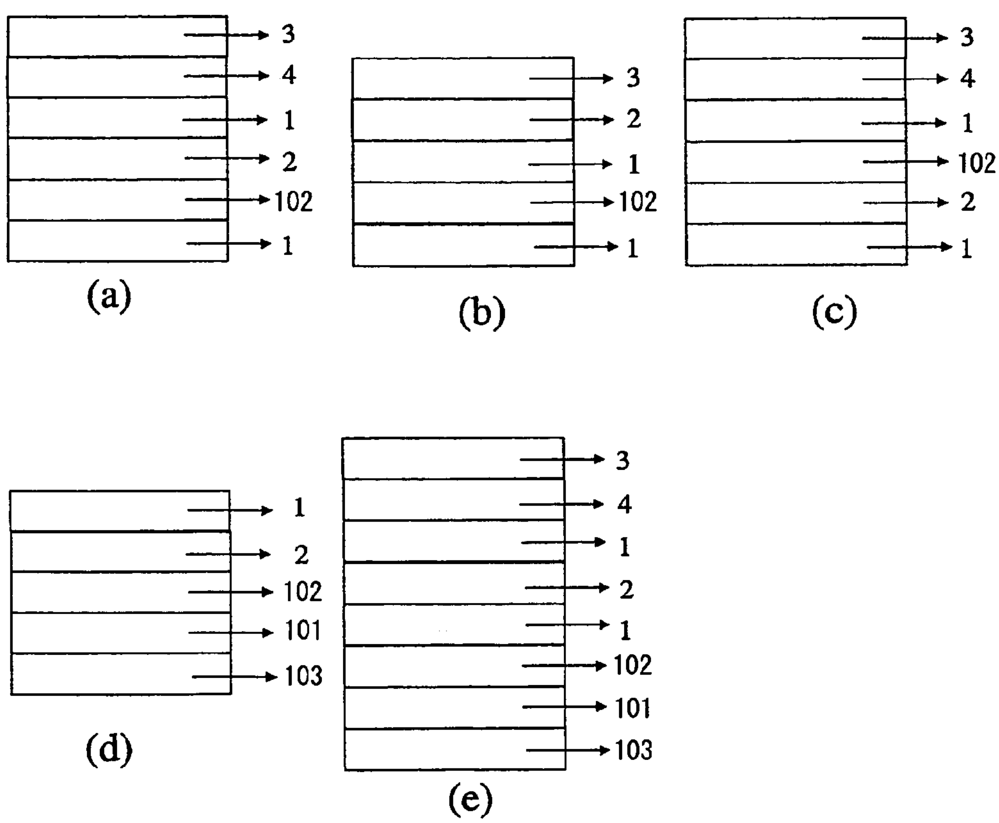
FIG. 15 is a schematic sectional diagram of an example of a polarizer of the present invention.

FIG. 15(*a*) to (*e*) shows other examples of the configurations of polarizers of the present invention.

The polarizer shown in FIG. 15(*a*) is prepared by laminating a stack of a transparent substrate film 1 (also serving as a protecting film for polarizing film 102), a polarizing film 102 and a spectrally anisotropic scattering layer 2 (also serving as a protecting film for polarizing film 102) to a stack of atransparent substrate film 1, a hard coat layer 4 and a low-refractive index layer 3. The polarizer shown in FIG. 15(*b*) is prepared by laminating a stack of a transparent substrate film 1 (also serving as a protecting film for polarizing film 102), a spectrally anisotropic scattering layer 2 and a low-refractive index layer 3 to a stack of a transparent substrate film 1 (also serving as a protecting film for polarizing film 102) and a polarizing film 102. The polarizer shown in FIG. 15(*c*) is prepared by laminating a stack of a transparent substrate film 1, a hard coat layer 4 and a low-refractive index layer 3 to a stack of a transparent substrate film 1, a spectrally anisotropic scattering layer 2 (also serving as a protecting film for polarizing film 102) and a polarizing film 102. The polarizer shown in FIG. 15(*d*) is prepared by integrally stacking a transparent substrate film 1, a spectrally anisotropic scattering layer 2 (also serving as a protecting film for polarizing film 102), a polarizing film 102, a protecting film 101 for the polarizing film and an optical compensation film 103. The polarizer shown in FIG.

15(*e*) is prepared by laminating a stack of a transparent substrate film 1, a hard coat layer 4 and a low-refractive index layer 3, a stack of a transparent substrate film 1 and a spectrally anisotropic scattering layer 2 and a stack of a polarizing film 102, a protecting film 101 for the polarizing film and an optical compensation film 103. In this manner, polarizers of the present invention include embodiments having various configurations without being limited to any specific preparation process, order of lamination and order of stacking so far as they comprise an anisotropic spectral scattering film of the present invention as a final structure.

Anisotropic spectral scattering films of the present invention are preferably used in combination with the anti-reflective film described in Japanese Patent Application No. 2002-68595 because color-viewing angle characteristics can be further improved. When a white color shift occurs by anisotropic spectral scattering films of the present invention as viewed from the front, the overall color balance can be controlled to a neutral white by adjusting a retardation film or color filter.

Anisotropic spectral scattering films of the present invention can be applied to liquid crystal displays of any mode using backlight such as TN, IPS, OCB, VA, ECB and STN. Especially in TN and OCB modes necessitating an optical compensation sheet to improve contrast, anisotropic spectral scattering films of the present invention capable of color-compensating independently are effective.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

(Preparation of an Anisotropic Spectral Scattering Film AS-1)

A holographic photopolymer (OmniDex HRF-352 from DuPont) was spin-coated to a thickness of 9 $\mu$m on a polyethylene terephthalate film and exposed to a two-beam interference system at a dose of 75 mJ/cm$^2$ using an argon laser at 488 nm. Then, the coating film was irradiated with UV light at an irradiance of 400 mW/cm$^2$ and a dose of 300 mJ/cm$^2$ using a 160 W/cm air-cooled metal halide lamp (from Eye Graphics Co., Ltd.) and then dried at 100° C. for 1 hour to prepare an anisotropic spectral scattering film AS-1 based on a one-dimensional diffraction grating.

(Preparation of an Anisotropic Spectral Scattering Film AS-2)

An aqueous solution W-1 for continuous phase was prepared by dissolving 100 g of polyvinyl alcohol (PVA205 from Kuraray Co., Ltd.) and 300 g of alkyl-modified polyvinyl alcohol (MP203 from Kuraray Co., Ltd.) in 1600 g of water. Into 900 g of the solution W-1 was mixed 100 g of a high-refractive index monomer MPSMA ([bis (4-methacryloyl thiophenyl) sulfide] from Sumitomo Seika Chemicals Co., Ltd.) and the resulting solution was ultrasonically dispersed to prepare a coating solution C-b 1.

The coating solution C-1 was cast onto a conveyor belt using a die and dried to a thickness of 100 $\mu$m. This film was stripped off the conveyor belt and longitudinally stretched to 200% at a humidity of 60% RH, 80° C. and directly laminated onto a saponified cellulose acetate film having a thickness of 80 $\mu$m (TD80U from Fuji Photo Film Co., Ltd.) using an aqueous solution of 5% by mass of polyvinyl alcohol (PVA117 from Kuraray Co., Ltd.) as an adhesive. This film was dried at 120° C. to prepare an anisotropic spectral scattering film AS-2.

(Preparation of a Polarizer AS-3 having an Anisotropic Spectral Scattering Film)

A commercially available polyvinyl alcohol film having a thickness of 75 $\mu$m (Kuraray Vinylon film VF-PS from Kuraray Co., Ltd.) was stretched to 700% in dry condition and directly immersed in an aqueous solution of 0.5 g/L iodine and 50 g/L potassium iodide at 30° C. for 1 minute. Then, the film was immersed in an aqueous solution of 100 g/L boric acid and 60 g/L potassium iodide at 70° C. for 5 minutes. Then, the film was washed in a water washing layer at 20° C. for 10 seconds and dried at 80° C. for 5 minutes. A saponified cellulose acetate film having a thickness of 80 $\mu$m (TD80U from Fuji Photo Film Co., Ltd.) was laminated onto one surface of the resulting film and the AS-2 was laminated onto the other surface using an aqueous solution of 5% by mass of polyvinyl alcohol (PVA117 from Kuraray Co., Ltd.) as an adhesive in such a manner that the stretching direction of the polarizer and the stretching direction of AS-2 could form an angle of 45 degrees, and the resulting laminate was dried at 120° C. to prepare a polarizer AS-3 having an anisotropic spectral scattering film.

(Preparation of a Polarizer AS-4 having an Anisotropic Spectral Scattering Film)

A commercially available polyvinyl alcohol film having a thickness of 75 $\mu$m (Kuraray Vinylon film VF-PS from Kuraray Co., Ltd.) was stretched to 700% in dry condition and directly immersed in an aqueous solution of 0.5 g/L iodine and 50 g/L potassium iodide at 30° C. for 1 minute. Then, the film was immersed in an aqueous solution of 100 g/L boric acid and 60 g/L potassium iodide at 70° C. for 5 minutes. Then, the film was washed in a water washing layer at 20° C. for 10 seconds and dried at 80° C. for 5 minutes. A saponified commercially available optical compensation sheet (WideView A film from Fuji Photo Film Co., Ltd.) was laminated onto one surface of the resulting film and the AS-2 was laminated onto the other surface using an aqueous solution of 5% by mass of polyvinyl alcohol (PVA117 from Kuraray Co., Ltd.) as an adhesive. The resulting laminate was dried at 120° C. to prepare a polarizer AS-4 having an anisotropic spectral scattering film.

(Preparation of an Anisotropic Spectral Scattering Film AS-5)

A relief was formed on the surface of a stainless plate by laser irradiation, and this plate was used as a master to transfer the relief onto the surface of a polyethylene terephthalate film having a thickness of 100 $\mu$m (FD100M from Fuji Photo Film Co., Ltd.) by hot embossing at 120° C. This film was stretched to 150% to prepare an anisotropic spectral scattering film AS-5.

The films prepared as described above were used to prepare liquid crystal displays of the examples by inserting an anisotropic spectral scattering film prepared above into a liquid crystal panel based on a TN liquid crystal cell (LC-20C1-S from Sharp Corporation) or removing a pair of polarizers in the liquid crystal cell and laminating a pair of polarizers having an anisotropic spectral scattering film prepared above in their places in O-mode.

Examples 1-1 to 1-3

A liquid crystal display having the configuration shown in FIG. 4 (Example 1-1) and a liquid crystal display having the configuration shown in FIG. 9 (Example 1-2) were prepared by arranging the anisotropic spectral scattering film AS-1 in such a manner that the diffraction grating could be vertically oriented. Polarizers having an optical compensation sheet LPT-HL56 (from Sanritz Corporation) were used as polarizers 45 (82) and 46 (83). Similarly, a liquid crystal display having the configuration shown in FIG. 9 (Example 1-3) was prepared by arranging AS-2 with the stretching direction being horizontal. Polarizers having an optical compensation sheet LPT-HL56 (from Sanritz Corporation) were used as polarizers 82 and 83.

Examples 1-4 and 1-5

Figure 16:
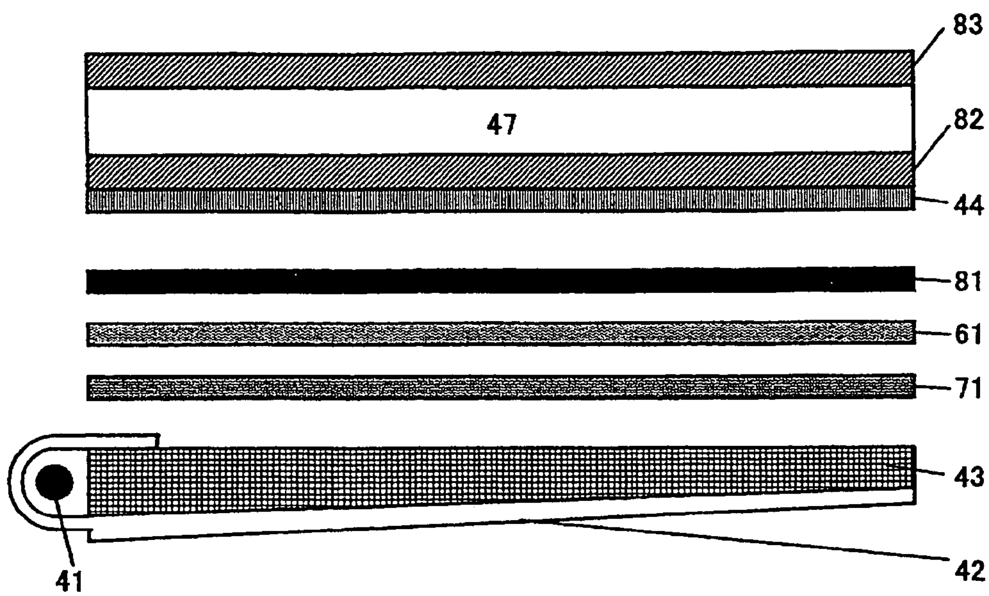
FIG. 16 is a schematic sectional diagram of an example of a liquid crystal display of the present invention.

A liquid crystal display having the configuration shown in FIG. 14 (Example 1-4) was prepared by arranging the polarizer AS-3 having an anisotropic spectral scattering film in such a manner that the stretching direction of AS-2 could be horizontal. The AS-3 was placed as a lower polarizer. Similarly, a liquid crystal display having the configuration shown in FIG. 16 (Example 1–5) was prepared by arranging the polarizer AS-4 having an anisotropic spectral scattering film with the stretching direction of AS-2 being horizontal. A polarizer having an optical compensation sheet LPT-HL56 (from Sanritz Corporation) was used as polarizer 83, and AS-4 was used as a lower polarizer.

Example 1-6

A liquid crystal display having the configuration shown in FIG. 9 (Example 1-6) was prepared by arranging the anisotropic spectral scattering film AS-5 with the stretching direction being horizontal. Polarizers having an optical compensation sheet LPT-HL56 (from Sanritz Corporation) were used as polarizers 82 and 83.

Comparative examples 1-1 to 1-4

A liquid crystal display having the configuration shown in FIG. 4 (Comparative example 1-1) was prepared in the same manner as Example 1-1 except that the anisotropic spectral scattering film AS-1 was not used. Similarly, liquid crystal displays having the configurations shown in FIG. 9 (Comparative example 1-2), FIG. 14 (Comparative example 1-3) and FIG. 16 (Comparative example 1-4) were prepared in the same manner as Example 1-3, 1-4 and 1-5, respectively, except that the anisotropic spectral scattering film AS-2 was not used.

(Evaluation of Characteristics and the Color Compensation Function of the Anisotropic Spectral Scattering Films)

1. Forward Scattered Light Intensity

The forward scattered light intensity was determined by measuring the spectral scattering intensity distributions in two orthogonal scattering planes using a three-dimensional spectro-goniometer (model GCMS-13 from Murakami Color Research Laboratory). A characteristic plane determining the anisotropy of the anisotropic spectral scattering film (e.g. a plane containing a stretching axis in stretched films or a grating plane of a diffraction grating in one-dimensional diffraction gratings) and a plane orthogonal to it were chosen as the two orthogonal scattering planes. The readings at 430 nm and 540 nm were taken as scattering intensities at 435 nm and 545 nm, respectively, because this system measures spectra in increments of 10 nm.

2. Transmittance of the liquid crystal cell

The spectral Transmittance of the Liquid Crystal cell was determined by using a three-dimensional spectro-goniometer (model GCMS-13 from Murakami Color Research Laboratory) from the intensity of the transmitted light in the direction of a scattering angle of 0° when a light source was located in the front and 45° upward, downward, rightward and leftward. The readings at 430 nm and 540 nm were taken as scattering intensities at 435 nm and 545 nm, respectively, because this system measures spectra in increments of 10 nm.

3. Color Shift Viewed from the Front

The liquid crystal displays of the examples were visually observed for color shift viewed from the direction 45° rightward.

TABLE 1

| | Fx(435)/Fx(545) | Fy(435)/Fy(545) | Fx(λ, θ)/ Fx(545, θ) − Fy(λ, θ)/ Fy(545, θ) |
|---|---|---|---|
| Example 1-1 | 4.80 | 1.00 | 3.80 |
| Example 1-2 | 4.80 | 1.00 | 3.80 |
| Example 1-3 | 2.85 | 1.74 | 1.11 |
| Example 1-4 | 3.23 | 1.90 | 1.33 |
| Example 1-5 | 2.44 | 1.64 | 0.80 |
| Example 1-6 | 1.82 | 1.23 | 0.59 |

TABLE 2

| | T(435)/T(545) | F(435)/F(545) | CCF | Color shift viewed from the front |
|---|---|---|---|---|
| Example 1-1 | 0.378 | 4.80 | −2.36 | Slightly blue |
| Example 1-2 | 0.461 | 4.80 | −2.05 | No |
| Example 1-3 | 0.461 | 2.85 | −1.00 | Slightly yellow |
| Example 1-4 | 0.378 | 3.23 | −1.39 | No |
| Example 1-5 | 0.461 | 2.44 | −0.78 | Slightly yellow |
| Example 1-6 | 0.461 | 1.82 | −0.44 | Slightly yellow |
| Comparative example 1-1 | 0.378 | 1.00 | 0.00 | Yellow |
| Comparative example 1-2 | 0.461 | 1.00 | 0.00 | Yellow |
| Comparative example 1-3 | 0.378 | 1.00 | 0.00 | Yellow |
| Comparative example 1-4 | 0.461 | 1.00 | 0.00 | Yellow |

As shown in Table 1, AS-1 to 5 prepared above all showed good spectrally anisotropic scattering. The results of the above examples and comparative examples using these films were shown in Table 2. All of the liquid crystal displays of the comparative examples appeared strongly yellow viewed from the direction 45° rightward, while all the liquid crystal displays of the examples, which fall within the scope of the present invention, appeared slightly yellow or showed no visually observable color shift. The use of anisotropic spectral scattering films of the present invention impaired neither contrast nor viewing angle. These results revealed that the color-viewing angle characteristics of liquid crystal displays can be greatly improved by anisotropic spectral scattering films of the present invention.

The optical films of Examples 1-1 to 1-6 have a spectrally anisotropic scattering function, i.e. the function of scattering light beams into arbitrary directions with an arbitrary color balance. Thus, the color-viewing angle characteristics of LCDs can be improved by using an anisotropic spectral scattering film having scattering characteristics designed to compensate for color-viewing angle characteristics of the liquid crystal cell in various LCD modes. According to the present invention, therefore, anisotropic spectral scattering films capable of improving color-viewing angle characteristics without impairing other characteristics such as contrast and viewing angle can be provided. According to the present invention, polarizers having an excellent color compensation function and liquid crystal displays having improved color-viewing angle characteristics using said films can be further provided.

Example 2-1

Preparation of an Ansotropic Spectral Scattering Film HKF-01

An aqueous solution W-1 for continuous phase was prepared by dissolving 100 g of polyvinyl alcohol (PVA205 from Kuraray Co., Ltd.) and 300 g of alkyl-modified polyvinyl alcohol (MP203 from Kuraray Co., Ltd.) in 1600 g of water. Into 900 g of the solution W-1 was mixed 100 g of a high-refractive index monomer compound bis(4-methacryloyl thiophenyl)sulfide (MPSMA from Sumitomo Seika Chemicals Co., Ltd.) and the resulting solution was ultrasonically dispersed to prepare a coating solution C-1 for shape-anisotropic dispersion film.

The coating solution C-1 was cast onto a conveyor belt using a die and dried to a thickness of 100 $\mu$m. This film was stripped off the conveyor belt and longitudinally stretched to 200% at a humidity of 60% RH, 80° C. and directly laminated onto a saponified cellulose acetate film having a thickness of 80 $\mu$m (TD80U from Fuji Photo Film Co., Ltd.) using an aqueous solution of 5% by mass of polyvinyl alcohol (PVA117 from Kuraray Co., Ltd.) as an adhesive. This film was dried at 120° C. to prepare an anisotropic spectral scattering film HKF-01.

The film prepared above (HKF-01) had a continuous phase (refractive index 1.50) consisting of polyvinyl alcohol and a disperse phase consisting of a high-refractive index monomer MPSMA. The disperse phase had an average size of 1.2 $\mu$m in the direction of the major axis and an average size of 0.3 $\mu$m in the direction of the minor axis. Thus, the disperse phase had an average aspect ratio of 4 and a refractive index of 1.70. The shape of the disperse phase was determined by observation under an electron microscope (S3500N/H from Hitachi Science Systems Ltd.).

Example 2-2

Preparation of an Anisotropic Spectral Scattering Film HBHKHB-01

(Preparation of a Coating Solution for Hard Coat Layer)

In a mixed solvent of 78.8 g of isopropanol, 157.2 g of methyl isobutyl ketone and 102.1 g of methanol was dissolved 256.5 g of a mixture of dipentaerythritol pentaacrylate and dipentaerythritol hexaacrylate (trade name: DPHA from Nippon Kayaku Co., Ltd.). To the resulting solution was added 5.4 g of a photoinitiator (trade name: Irgacure 907 from Ciba Specialty Chemicals). The mixed solution was stirred to prepare a coating solution for hard coat layer. This solution was applied and UV-cured to give a coating film having a refractive index of 1.53.

(Preparation of a Coating Solution for Low-Refractive Index Layer)

To 93 g of a thermally crosslinkable fluoropolymer having a refractive index of 1.42 (JN-7228 from JSR Corporation) were added 8 g of MEK-ST (a dispersion of $SiO_2$ particles having an average particle diameter 10 to 20 nm in methyl ethyl ketone at a solid concentration of 30% by mass from Nissan Chemical Industries, Ltd.) and 100 g of methyl ethyl ketone, and the mixture was stirred and then filtered through a propylene filter having a pore size of 1.0 $\mu$m to prepare a coating solution for low-refractive index layer.

(Preparation of an Anti-Reflective Film HBF-01)

The coating solution for hard coat layer was applied on a cellulose acetate film having a thickness of 80 $\mu$m (TD80U from Fuji Photo Film Co., Ltd.) using a bar coater and dried at 120° C. and then the coating film was cured by UV irradiation at an irradiance of 400 mW/cm$^2$ and a dose of 300 mJ/cm$^2$ using a 160 W/cm air-cooled metal halide lamp (from Eye Graphics Co., Ltd.) to form a hard coat layer having a thickness of 6.0 $\mu$m.

The coating solution for low-refractive index layer was applied on the hard coat layer using a bar coater and dried at 80° C. and then thermally crosslinked at 120° C. for 10 minutes to form a low-refractive index layer having a thickness of 0.096 $\mu$m, whereby an anti-reflective film HBF-01 was prepared.

(Preparation of an Anisotropic Spectral Scattering Film Having an Anti-Reflective Function HBHKHB-01)

An anisotropic spectral scattering film having an anti-reflective function HBHKHB-01 was prepared by laminating the anti-reflective film HBF-01 onto the anisotropic spectral scattering film HKF-01 in such a manner that the triacetyl cellulose side of HBF-01 could be adjacent to the spectrally anisotropic scattering layer side of HKF-01.

Comparative example 2-1

Preparation of a Light-Scattering Film Having an Anti-Reflective Function Using Spherical Particles HBHSF-01

(Preparation of a Light-Scattering Film HSF-01)

A light-transmitting resin consisting of 100 parts by mass of a UV-curable resin (DeSolite Z7526 from JSR Corporation; refractive index 1.51) and light-transmitting microparticles consisting of 12 parts by mass of benzoguanamine melamine formaldehyde beads (spherical particles having a particle diameter of 0.5 $\mu$m and a refractive index of 1.68 from Nippon Shokubai Co., Ltd.) and 11 parts by mass of crosslinked styrene beads (SX350H from Soken Kagaku, spherical particles having a particle diameter of 3.5 $\mu$m and a refractive index of 1.61) were mixed and adjusted to a solids content of 50% in methyl ethyl ketone/acetone (40/60 weight ratio). This solution was coated on a cellulose acetate film (TD-80U from Fuji Photo Film Co., Ltd.) to a dry film thickness of 3.0 $\mu$m, and the solvent was dried off and then the coating layer was cured by UV irradiation at an irradiance of 400 mW/cm$^2$ and a dose of 300 mJ/cm$^2$ using a 160 W/cm air-cooled metal halide lamp (from Eye Graphics Co., Ltd.) to form a light-scattering layer, whereby a light-scattering film (HSF-01) was prepared.

(Preparation of a Light-Scattering Film Having an Anti-Reflective Function using Spherical Particles HBHSF-01)

The coating solution for low-refractive index layer was applied on the light-scattering layer of the light-scattering film HSF-01 using a bar coater and dried at 80° C. and then thermally crosslinked at 120° C. for 10 minutes to form a low-refractive index layer having a thickness of 0.096 μm, whereby a light-scattering film having an anti-reflective function (HBHSF-01) was prepared.

[Preparation of Polarizers and Liquid Crystal Displays]

(Preparation of a Polarizer on the Viewer's Side SHB-01)

A polarizing film was prepared by adsorbing iodine to a stretched polyvinyl alcohol film. The HBHKHB-01 was saponified and laminated onto one side of the polarizing film using a polyvinyl alcohol adhesive in such a manner that the transparent substrate film of HBHKHB-01 could be on the side of the polarizing film and that the stretching direction of the polarizing film and the stretching direction of HBHKHB-01 could form an angle of 45°. An optical compensation film having an optically anisotropic layer formed of a liquid crystalline compound "WVSA12B" (from Fuji Photo Film Co., Ltd.) was saponified and laminated onto the opposite side using a polyvinyl alcohol adhesive in such a manner that the film substrate could be on the side of the polarizing film. In this manner, a polarizer on the viewer's side (SHB-01) was prepared. SHB-01 is a polarizer having the configuration shown in FIG. 15(*e*) described above.

(Preparation of a Polarizer on the Viewer's Side for Comparative Examples HSHB-01)

Similarly, HBHSF-01 was saponified and laminated onto one side of the polarizing film using a polyvinyl alcohol adhesive in such a manner that the transparent substrate film of HBHSF-01 could be on the side of the polarizing film. An optical compensation film having an optically anisotropic layer formed of a liquid crystalline compound "WVSA12B" (from Fuji Photo Film Co., Ltd.) was saponified and laminated onto the opposite side using a polyvinyl alcohol adhesive in such a manner that the film substrate could be on the side of the polarizing film. In this manner, a polarizer on the viewer's side for comparative examples (HSHB-01) was prepared.

(Preparation of a Polarizer on the Backlight Side BHB-01)

A polarizing film was prepared by adsorbing iodine to a stretched polyvinyl alcohol film. A commercially available cellulose acetate film ("Fujitac TD80U" from Fuji Photo Film Co., Ltd.) was saponified and laminated onto one side of the polarizing film using a polyvinyl alcohol adhesive. An optical compensation film having an optically anisotropic layer formed of a liquid crystalline compound "WVSA12B" (from Fuji Photo Film Co., Ltd.) was saponified and laminated onto the opposite side using a polyvinyl alcohol adhesive in such a manner that the cellulose acetate film could be on the side of the polarizing film. In this manner, a polarizer on the backlight side (BHB-01) was prepared.

Example 2-3

Preparation of a Liquid Crystal Display

A pair of polarizers provided in a liquid crystal display based on a TN liquid crystal cell (LC-20C1-S from Sharp Corporation) were removed and, as a substitute, the polarizer on the viewer's side prepared above (SHB-01) was laminated onto the viewer's side via an adhesive in such a manner that the optical compensation film could be on the side of the liquid crystal cell. The polarizer on the backlight side (BHB-01) was laminated on the backlight side via an adhesive in such a manner that the optical compensation film could be on the side of the liquid crystal cell. The transmission axis of the polarizer on the viewer's side and the transmission axis of the polarizer on the backlight side were arranged in O-mode.

Comparative example 2-2

Preparation of a Liquid Crystal Display

A pair of polarizers provided in a liquid crystal display based on a TN liquid crystal cell (LC-20C1-S from Sharp Corporation) were removed and commercially available polarizers (LL-82-12WNA from Sanritz Corporation) were laminated in their places. The transmission axis of the polarizer on the viewer's side and the transmission axis of the polarizer on the backlight side were arranged in O-mode.

Comparative example 2-3

Preparation of a Liquid Crystal Display

A pair of polarizers provided in a liquid crystal display based on a TN liquid crystal cell (LC-20C1-S from Sharp Corporation) were removed and, as a substitute, the polarizer on the viewer's side for comparative examples prepared above (HSHB-01) was laminated onto the viewer's side via an adhesive in such a manner that the optical compensation film could be on the side of the liquid crystal cell. The polarizer on the backlight side (BHB-01) was laminated on the backlight side via an adhesive in such a manner that the optical compensation film could be on the side of the liquid crystal cell. The transmission axis of the polarizer on the viewer's side and the transmission axis of the polarizer on the backlight side were arranged in O-mode.

(Evaluation of the Light-Scattering Color Compensation Films)

1. Forward Scattered Light Intensity

The forward scattered light intensity was determined by measuring the spectral scattering intensity distributions in two orthogonal scattering planes using a three-dimensional spectro-goniometer (model GCMS-13 from Murakami Color Research Laboratory) . A characteristic plane determining the anisotropy of the light-scattering film (e.g. a plane containing the stretching axis in stretched films or a plane parallel to the major axis in shape-anisotropic particles) and a plane orthogonal to it were chosen as the two orthogonal scattering planes. The readings at 430 nm and 540 nm were taken as scattering intensities at 435 nm and 545 nm, respectively, because this system measures spectra in increments of 10 nm. The evaluation results are shown in Table 3.

TABLE 3

| | $Fx(435, \theta)/Fx(545, \theta)$<br>$Fx(435, \theta)/Fx(610, \theta)$ | $Fx(435, \theta)/Fx(545, \theta) - Fy(435, \theta)/Fy(545, \theta)$<br>$Fx(435, \theta)/Fx(610, \theta) - Fy(435, \theta)/Fy(610, \theta)$ |
|---|---|---|
| Example 2-1 | 1.35<br>1.68 | 0.14<br>0.16 |
| Example 2-2 | 1.35<br>1.68 | 0.14<br>0.16 |
| Comparative example 2-1 | 1.0<br>1.0 | 0.0<br>0.0 |

HKF-01 showed good spectrally anisotropic scattering (Table 3). Even when an anti-reflective layer was stacked on the light-scattering layer (HBHKHB-01), spectral scattering characteristics were not affected and good spectrally anisotropic scattering was shown.

The liquid crystal displays prepared in Example 2-3 and Comparative examples 2-2 and 2-3 were visually observed for color shift viewed from the direction 45° rightward to reveal that the liquid crystal display of Example 2-3 showed no distinct color shift except for slight yellowing in contrast to the liquid crystal display of Comparative example 2-2 which showed a strongly yellow coloration viewed from the direction 45° rightward and the liquid crystal display of Comparative example 2-3 which showed a perceptible level of yellow coloration viewed from the direction 45° rightward.

These results indicated that the color-viewing angle characteristics of liquid crystal displays can be improved by spectrally anisotropic light-scattering films of the present invention.

The spectrally anisotropic light-scattering films of Examples 2-1 to 2-3 have an anisotropic scattering function based on the shape-anisotropy of the disperse phase, i.e. the function of scattering light beams at different angle distributions in the direction of the major axis of the disperse phase and the direction orthogonal to it. Thus, the color-viewing angle characteristics of LCDs can be improved by using an anisotropic scattering film having scattering characteristics designed to compensate for color-viewing angle characteristics of the liquid crystal cell in various LCD modes. Especially, TN-LCDs had the problem of yellowing of white when viewed from the horizontal direction because the birefringence of the liquid crystal resulted in a considerable color shift depending on the voltage applied. However, our studies revealed the presence of a region in which the scattering efficiency/angle distribution varies at three wavelengths of B (435 nm) , G (545 nm) and R (610 nm) by controlling the shape of the scatterer (the size of the section viewed from the observing angle) . Horizontal color shift in TN-LCDs can be reduced without sacrificing the CR viewing angle or grayscale inversion by preparing an anisotropic light-scattering film containing particles having an appropriate size or aspect ratio/refractive index and inserting it into the TN-LCDs.

According to the present invention, therefore, anisotropic spectral scattering films capable of improving color-viewing angle characteristics without sacrificing other optical characteristics can be provided by means other than the conventional color compensation techniques. According to the present invention, polarizers having an excellent color compensation function and liquid crystal displays having improved color-viewing angle characteristics using said films can be further provided.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An anisotropic spectral scattering film wherein the scattered light intensity Fx(λ, θ) at azimuthal angle θ and incident wavelength λ in an arbitrary scattering plane with respect to a film surface and the scattered light intensity Fy(λ, θ) at azimuthal angle θ and incident wavelength λ in a scattering plane orthogonal to said scattering plane satisfy the following equations (1) and (2):

$$Fx(\lambda, \theta)/Fx(545, \theta) \geqq 1.2 \quad (1)$$

$$\{Fx(\lambda, \theta)/Fx(545, \theta) - Fy(\lambda, \theta)/Fy(545, \theta)\} \geqq 0.1 \quad (2)$$

provided that λ is 435 or 610 nm and θ is an arbitrary angle selected from 30–70°.

2. An anisotropic spectral scattering film wherein Fx(λ, θ) and Fy(λ, θ) defined in claim 1 satisfy the following equation (3):

$$\{Fx(\lambda, \theta)/Fx(545, \theta) - 1\}\{Fy(\lambda, \theta)/Fy(545, \theta) - 1\} < 0 \quad (3)$$

provided that λ is 435 or 610 nm and θ is an arbitrary angle selected from 30–70°.

3. The anisotropic spectral scattering film of claim 1 comprising a one-dimensional diffraction grating or photonic crystal structure at least partially.

4. The anisotropic spectral scattering film of claim 1 comprising shape-anisotropic particles dispersed in the film.

5. The anisotropic spectral scattering film of claim 1 comprising a shape-anisotropic relief on the surface.

6. The anisotropic spectral scattering film of claim 1 comprising a spectrally anisotropic scattering layer having a continuous phase consisting of a light-transmitting resin and a disperse phase having an aspect ratio of 2 to 20 wherein the refractive index difference between said continuous phase and said disperse phase is 0.03 to 0.30.

7. The anisotropic spectral scattering film of claim 1 further comprising a low-refractive index layer having a refractive index of 1.35 to 1.45.

8. A polarizer comprising at least polarizing film and an anisotropic spectral scattering film of claim 1.

9. The polarizer of claim 8 further comprising an optical compensation film on a different side of said polarizing film from the side having said anisotropic spectral scattering film thereon.

10. A liquid crystal display comprising a backlight;

a liquid crystal cell consisting of a pair of substrates being arranged to oppose each other and having an electrode on at least one of them, and a liquid crystal layer sandwiched between said substrates; and a pair of polarizers placed outside said liquid crystal cell;

wherein an anisotropic spectral scattering film of claim 1 is further included, or at least one of said pair of polarizers is a polarizer of claim 8.

11. The liquid crystal display of claim 10 wherein the transmittance T(λ) of incident light at wavelength λ on said liquid crystal cell in at least one direction upward, downward, rightward or leftward at angle θ and the scattered light intensity F(λ) of forward scattered light in the same direction as that of said transmittance T(λ) of incident light at wavelength λ on said anisotropic spectral scattering film satisfy the following equation (4):

$$\{(T(\lambda)/T(545)) - 1\} \times \{(F(\lambda)/F(545)) - 1\} < 0 \quad (4)$$

provided that λ is 435 or 610 nm and θ is an arbitrary angle selected from 30–70°.

12. The liquid crystal display of claim 10 wherein said anisotropic spectral scattering film is disposed between said backlight and said liquid crystal layer.

13. The liquid crystal display of claim 10 wherein the display mode is TN mode or OCB mode.

* * * * *